(12) United States Patent
Lehtiniemi et al.

(10) Patent No.: US 12,067,321 B2
(45) Date of Patent: Aug. 20, 2024

(54) APPARATUS, A METHOD AND A COMPUTER PROGRAM FOR ROTATING DISPLAYED VISUAL INFORMATION

(71) Applicant: Nokia Technologies Oy, Espoo (FI)

(72) Inventors: Arto Juhani Lehtiniemi, Lempäälä (FI); Miikka Tapani Vilermo, Siuro (FI); Anssi Sakari Rämö, Tampere (FI); Toni Mäkinen, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 136 days.

(21) Appl. No.: 17/580,383

(22) Filed: Jan. 20, 2022

(65) Prior Publication Data

US 2022/0253262 A1 Aug. 11, 2022

(30) Foreign Application Priority Data

Feb. 11, 2021 (EP) ..................................... 21156520

(51) Int. Cl.
| | | |
|---|---|---|
| G06F 3/14 | (2006.01) | |
| G06F 3/0346 | (2013.01) | |
| G06T 3/40 | (2006.01) | |
| H04R 1/40 | (2006.01) | |
| H04R 3/00 | (2006.01) | |

(52) U.S. Cl.
CPC .............. *G06F 3/14* (2013.01); *G06F 3/0346* (2013.01); *G06T 3/40* (2013.01); *H04R 1/406* (2013.01); *H04R 3/005* (2013.01)

(58) Field of Classification Search
None
See application file for complete search history.

(56) References Cited

U.S. PATENT DOCUMENTS

| | | | |
|---|---|---|---|
| 2003/0139933 A1 | 7/2003 | Kimmel | |
| 2014/0100955 A1* | 4/2014 | Osotio | G06Q 30/0269 715/764 |
| 2015/0186109 A1 | 7/2015 | Jarvinen et al. | |
| 2015/0278998 A1* | 10/2015 | Jothiswaran | G09G 5/00 345/650 |
| 2016/0148624 A1* | 5/2016 | Jonan | H04R 1/40 381/92 |
| 2017/0187866 A1* | 6/2017 | Li | G06F 3/04883 |

(Continued)

FOREIGN PATENT DOCUMENTS

WO 2020/003820 A1 1/2020

OTHER PUBLICATIONS

Liu, Eric. Proximity-based Triggering of Screen Restrictions to Avoid Eye Strain, (Year: 2020).*

(Continued)

*Primary Examiner* — Sarah Le
(74) *Attorney, Agent, or Firm* — ALSTON & BIRD LLP

(57) ABSTRACT

According to various, but not necessarily all, embodiments there is provided an apparatus comprising means for: determining a direction of arrival of sound from a sound source relative to a user device using at least one captured audio signal; controlling an angle of orientation of visual information displayed on a display, wherein the angle of orientation of the visual information is at least partially dependent upon the determined direction of arrival of sound from the sound source relative to the user device.

19 Claims, 21 Drawing Sheets

(56) References Cited

U.S. PATENT DOCUMENTS

| | | | |
|---|---|---|---|
| 2019/0163281 A1* | 5/2019 | Cain | G06F 1/1641 |
| 2019/0311718 A1* | 10/2019 | Huber | H04R 27/00 |
| 2021/0099505 A1* | 4/2021 | Ravine | H04L 65/61 |
| 2021/0271358 A1* | 9/2021 | Tsuruta | G06V 40/174 |

OTHER PUBLICATIONS

Cheng et al., "IRotate: Automatic screen rotation based on face orientation", Proceedings of the SIGCHI Conference on Human Factors in Computing Systems, May 2012, pp. 2203-2210.

Yiwere et al., "Sound Source Distance Estimation Using Deep Learning: An Image Classification Approach", Sensors, vol. 20, 2020, pp. 1-19.

Touse et al., "MEMS directional sound sensor with simultaneous detection of two frequency bands", IEEE Sensors, Nov. 1-4, 2010, pp. 2422-2425.

Extended European Search Report received for corresponding European Patent Application No. 21156520.5, dated Jul. 14, 2021, 8 pages.

* cited by examiner

APPARATUS, A METHOD AND A COMPUTER PROGRAM FOR ROTATING DISPLAYED VISUAL INFORMATION

TECHNOLOGICAL FIELD

Embodiments of the present disclosure relate to an apparatus, a method and a computer program for rotating displayed visual information. Some relate to an apparatus, a method and a computer program for rotating displayed visual information in mobile devices.

BACKGROUND

Visual information displayed on displays can be rotated using various methods. Typically the visual information is rotated so that a user of the display can view the visual information at a particular orientation.

BRIEF SUMMARY

According to various, but not necessarily all, embodiments there is provided an apparatus comprising means for:

determining a direction of arrival of sound from a sound source relative to a user device using at least one captured audio signal;

controlling an angle of orientation of visual information displayed on a display, wherein the angle of orientation of the visual information is at least partially dependent upon the determined direction of arrival of sound from the sound source relative to the user device.

In some, but not necessarily all, examples, the apparatus comprises means for controlling a position that the visual information is displayed at on the display, wherein the position of the visual information displayed on the display is at least partially dependent upon the determined direction of arrival of sound from the sound source relative to the user device.

In some, but not necessarily all, examples, the apparatus comprises means for determining changes of the direction of arrival of sound from the sound source relative to the user device;

wherein the means for controlling the angle of orientation of the visual information displayed on the display correspondingly changes the angle of orientation of the visual information in response to a determined change in the direction of arrival of sound from the sound source.

In some, but not necessarily all, examples, the apparatus comprises means for changing the angle of orientation of the visual information to a predefined angle after determining that the determined direction of arrival of sound from the sound source satisfies a threshold direction of arrival associated with the predefined angle.

In some, but not necessarily all, examples, the apparatus comprises means for: estimating a location of the sound source relative to the user device whilst the sound source is not producing sound; and wherein the angle of orientation of the visual information is at least partially dependent upon the estimated location of the sound source relative to the user device whilst the sound source is not producing sound.

In some, but not necessarily all, examples, the apparatus comprises means for altering a scale of the visual information and/or cropping the visual information, wherein the altering and/or cropping is at least partially dependent upon the angle of orientation of the visual information.

In some, but not necessarily all, examples, user interface controls associated with the visual information are displayed on the display, wherein the apparatus comprises means for adjusting a position and/or orientation of the user interface controls, wherein the adjusting is at least partially dependent upon the angle of orientation of the visual information.

In some, but not necessarily all, examples, the apparatus comprises means for:

determining a distance of the sound source from the user device;

preventing changing of the angle of orientation of the visual information displayed on the display if the determined distance of the sound source is greater than a threshold distance from the user device.

In some, but not necessarily all, examples, the angle of orientation of the visual information displayed on the display additionally depends upon application settings of an application running on the display, wherein the application is associated with the visual information.

In some, but not necessarily all, examples, the visual information comprises one or more images and/or video captured by image capture means of the user device;

wherein if the user device is rotated whilst the one or more images and/or video is being captured, the means for controlling the angle of orientation of the visual information maintains the angle of orientation of the visual information displayed on the display by determining the direction of arrival of sound from the sound source relative to the rotated user device to counteract changes to the angle of orientation of the visual information displayed on the display that do or could occur due to the rotation of the user device.

In some, but not necessarily all, examples, the apparatus comprises means for:

identifying the sound source as a previously known sound source; and restricting changing of the angle of orientation of the visual information, wherein unknown sound sources are restricted from causing changing of the angle of orientation of the visual information.

In some, but not necessarily all, examples, the display comprises means for enabling one or more gesture controls, wherein the one or more gesture controls are activated by corresponding gesture inputs by a user, wherein the apparatus comprises means for controlling adjustment of the one or more gesture controls, wherein the one or more gesture controls are adjusted if the angle of orientation of the visual information is changed so that when a gesture input is performed relative to the changed orientation of the visual information, the gesture input is recognized, and the corresponding gesture control is activated; and/or wherein the display comprises means for enabling one or more touch controls, wherein the one or more touch controls are activated by corresponding touch inputs by a user, wherein the apparatus comprises means for controlling adjustment of the one or more touch controls, wherein the one or more touch controls are adjusted if the angle of orientation of the visual information is changed so that when a touch input is performed relative to the changed orientation of the visual information, the touch input is recognized, and the corresponding touch control is activated.

In some, but not necessarily all, examples, the apparatus comprises means for:

determining a direction of arrival of sound from a second sound source relative to the user device using at least one captured audio signal;

controlling an angle of orientation of second visual information displayed on the display, wherein the visual information and the second visual information are displayed on the display at the same time, wherein the angle of orientation of the second visual information is at least partially dependent upon the determined direction of arrival of sound from the second sound source relative to the user device.

According to various, but not necessarily all, embodiments there is provided a method comprising:

determining a direction of arrival of sound from a sound source relative to a user device using at least one captured audio signal;

controlling an angle of orientation of visual information displayed on a display, wherein the angle of orientation of the visual information is at least partially dependent upon the determined direction of arrival of sound from the sound source relative to the user device.

According to various, but not necessarily all, embodiments there is provided a computer program that, when run on a computer, performs:

determining a direction of arrival of sound from a sound source relative to a user device using at least one captured audio signal;

controlling an angle of orientation of visual information displayed on a display, wherein the angle of orientation of the visual information is at least partially dependent upon the determined direction of arrival of sound from the sound source relative to the user device.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1A:
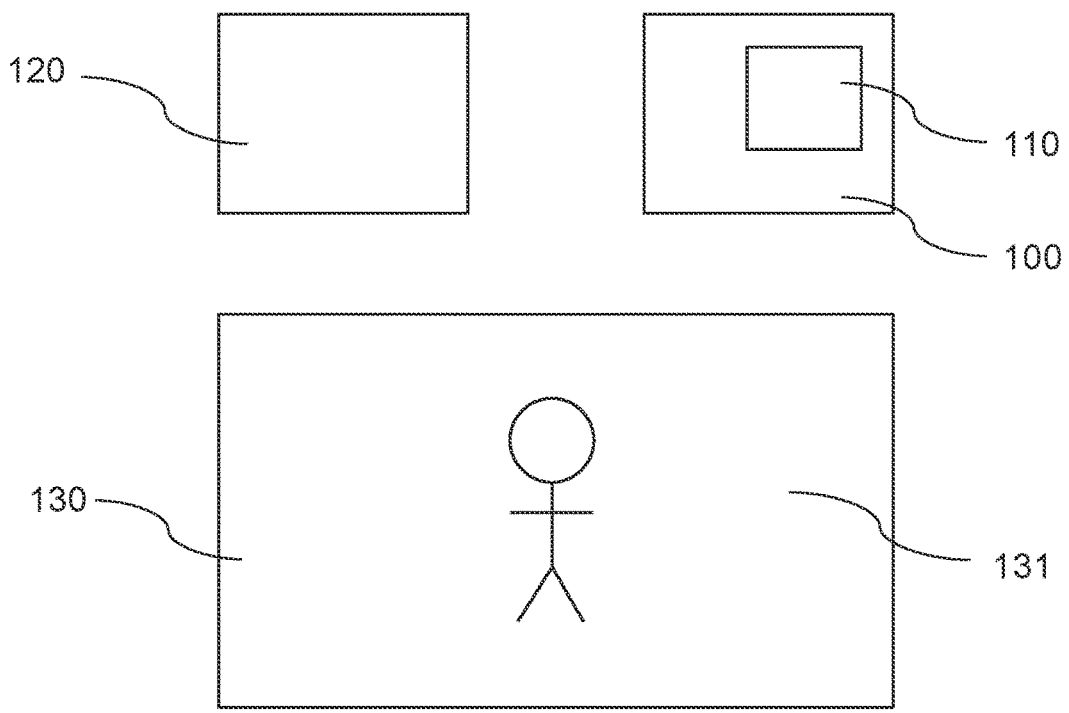
FIG. 1A shows an example of the subject matter described herein.

The following description describes apparatus, methods and computer programs that: determine a direction of arrival of sound from a sound source 140 relative to a user device 120 using at least one captured audio signal 141; control an angle of orientation of visual information 131 displayed on a display 130, wherein the angle of orientation is at least partially dependent upon the determined direction of arrival of sound from the sound source 140 relative to the user device 120.

The apparatus, methods and computer programs provide the technical effect of changing the angle of orientation of visual information displayed on the display when other techniques of changing the angle of orientation of the visual information are not available or would result in incorrectly orientating the visual information, which can result in the visual information not being aligned with a user's viewpoint of the display. Changing the angle of orientation of the visual information causes rotation of the visual information.

For example, it is a common problem when taking photographs or videos with a mobile device, whilst the mobile device camera is facing down to the ground or up towards the sky, that the end result is unintentionally rotated by 90° due to errors in automatic display rotation, for example due to the accelerometer in the mobile device causing rotation of the display. This also occurs when the mobile device is tilted slightly from facing the ground or facing the sky. The user may tilt the mobile device to get a good fit for a photo or video, or in situations where the mobile device is capturing spatial audio, the user may tilt the device to avoid wind noise if they are outside, especially where live monitoring of capture is available.

This situation is particularly problematic if the video and/or photographs are being livestreamed, as it may not be possible to correct unintentional rotation in post-processing.

The apparatus, methods and computer programs therefore solve the technical problem of how to control the angle of orientation of visual information displayed on a display. The apparatus, methods and computer programs described can be for controlling the angle of orientation of visual information displayed on a display.

Figure 1B:
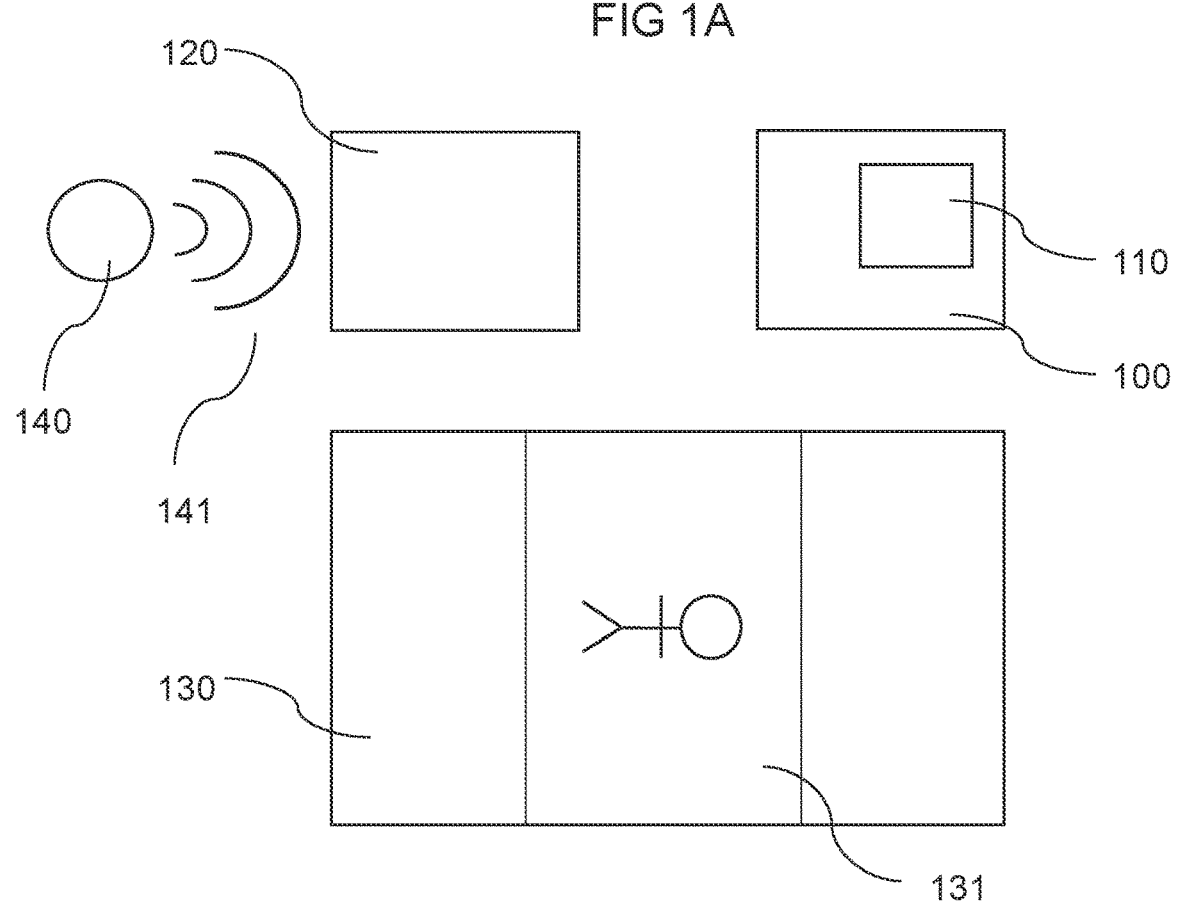
FIG. 1B shows an example of the subject matter described herein.

An example apparatus 100 is illustrated in FIG. 1A and FIG. 1B.

FIG. 1A illustrates visual information 131 displayed on a display 130.

In FIG. 1B a sound source 140 is illustrated. The sound source 140 produces at least one audio signal 141. The at least one audio signal 141 is captured and is used to determine a direction of arrival of sound from the sound source 140 relative to a user device 120. The apparatus 100 comprises means 110 for determining the direction of arrival of sound from the sound source 140 relative to the user device 120 using the at least one captured audio signal 141.

The apparatus 100 comprises means 110 for controlling an angle of orientation of visual information 131 displayed on the display 130. In this example, the angle of orientation of the visual information 131 in FIG. 1B has changed compared to the angle of orientation in FIG. 1A. The angle of orientation of the visual information is at least partially dependent upon the determined direction of arrival of sound from the sound source 140 relative to the user device 120 in FIG. 1B.

The direction of arrival of sound from a sound source relative to the user device 120 is defined with respect to an origin, which is defined as a point associated with the location of the user device 120. For example, the origin can be at the center of the user device 120. The direction of arrival can be defined using a three dimensional bearing (θ, φ) where θ, φ are orthogonal angles such as the elevation angle φ (which can be expressed as a polar angle 90°−φ) and the azimuthal angle θ.

The direction of arrival of sound can be estimated using for example Time Difference Of Arrival (TDOA) based methods if using two or more microphones or level difference based methods if using two or more directional microphones or specific audio sensor built for direction detection such as:

Michael Touse et Al.: "MEMS directional sound sensor with simultaneous detection of two frequency bands", SENSORS, 2010 IEEE.

In some examples, the reference plane of the azimuth angle can be the surface of the earth. In some examples, the elevation of the direction of arrival of the sound from the sound source is not used to control the angle of orientation of the visual information.

The angle of orientation of the visual information can be defined with respect to a reference orientation of the visual information 131. For example, the orientation of the visual information 131 in FIG. 1A can be defined as the reference orientation, and the angle of orientation of the visual information 131 is therefore at 90° relative to the reference orientation in FIG. 1B. Any suitable reference orientation can be defined.

Figure 2A:
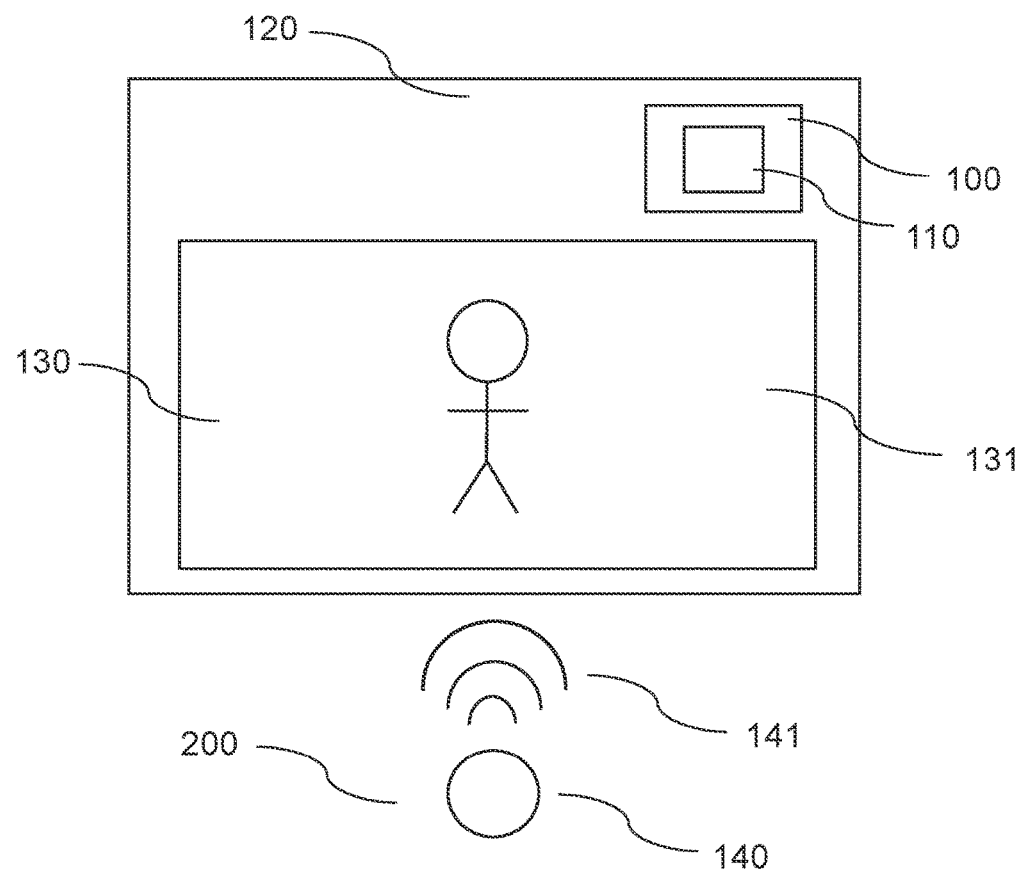
FIG. 2A shows an example of the subject matter described herein.
Figure 2B:
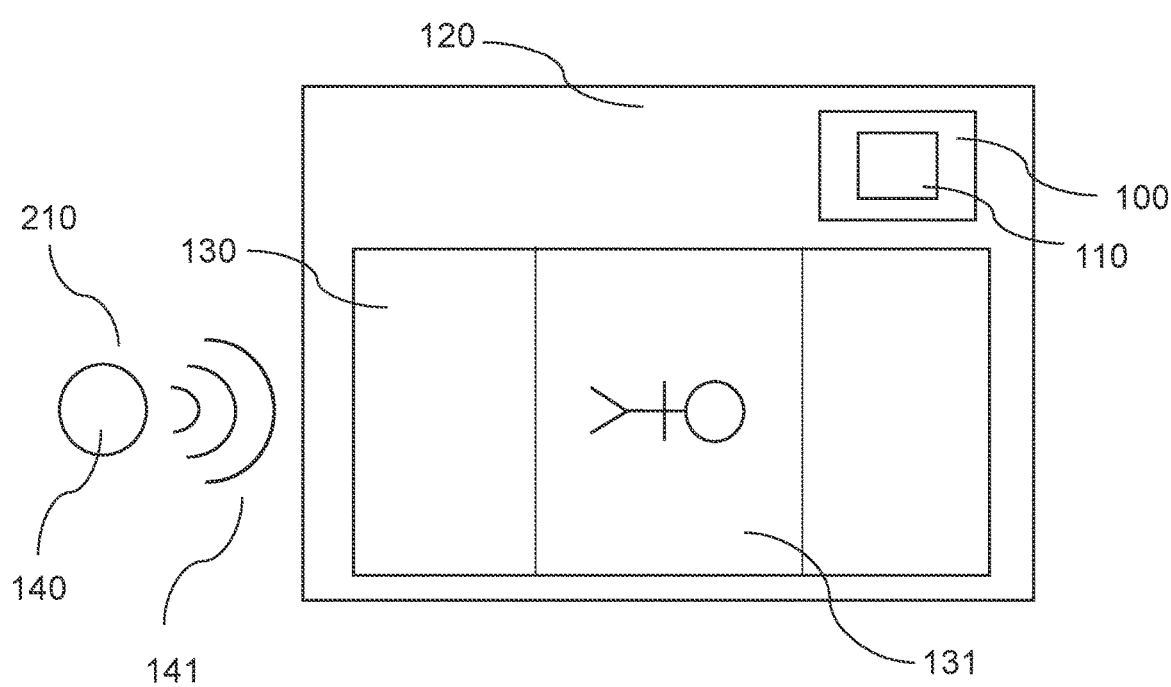
FIG. 2B shows an example of the subject matter described herein.

FIG. 2A and FIG. 2B illustrate another example apparatus 100. In this example the user device 120 comprises the apparatus 100 and the display 130.

As illustrated in FIG. 2A the sound source 140 is at a first position 200 and produces at least one audio signal 141. In FIG. 2B the sound source 140 is at a second position 210 and produces the at least one audio signal 141. In FIG. 2B the angle of orientation of the visual information 131 has changed compared to its angle of orientation in FIG. 2A. The angle of orientation is at least partially dependent upon the determined direction of arrival of sound from the sound source 140 relative to the user device 120.

In some examples, there is predefined mapping between the angle of orientation that the visual information 131 is displayed at on the display 130 and the determined direction of arrival of sound from a sound source 140. For example, a particular angle of orientation can be associated with a particular determined direction of arrival of sound. In some examples, a particular angle of orientation can be associated with a range of determined directions of arrival of sound.

In this example the visual information 131 was presented at its angle of orientation shown in FIG. 2A before the direction of arrival of sound from the sound source 140 was determined. In this example, the determined direction of arrival of sound from the sound source 140 in FIG. 2A is associated with the angle of orientation of the visual information 131 presented in FIG. 1A. Therefore after the direction of arrival of sound from the sound source 140 is determined, the angle of orientation of the visual information 131 does not change as it is already at the angle of orientation associated with the determined direction of arrival of sound from the sound source 140.

When the position of the sound source 140 changed to second position 210 illustrated in FIG. 2B, the determined direction of arrival of sound from the sound source 140 changed compared to the determined direction of arrival of sound in FIG. 2A. The angle of orientation of the visual information 131 changed in FIG. 2B compared to its angle of orientation in FIG. 2A. This is because the determined direction of arrival of sound from the sound source 140 in FIG. 2B is associated with the angle of orientation of the visual information 131 illustrated in FIG. 2B, and is not associated with the angle of orientation of the visual information 131 illustrated in FIG. 2A.

In some examples the angle of orientation of the visual information 131 can be changed regardless of the type of sound produced by the sound source 140. In other examples, the angle of orientation of the visual information 131 is changed in dependence upon the apparatus 100 recognizing the sound produced by the sound source 140 as a command to change the angle of orientation of the visual information 131. For example if the sound source 140 is a user, then the sound produced can be the voice of the user, and in response to recognizing a voice command from the user, the apparatus 100 can change the angle of orientation of the visual information 131. In some examples, any change to the angle of orientation of the visual information 131 is dependent upon an application associated with the visual information.

In some examples, the apparatus sets a threshold change of the determined direction of arrival of sound from the sound source 140 required to trigger changing of the angle of orientation of the visual information 131 displayed on the display 130.

In some examples, the means 110 comprises one or more audio sensors, wherein the one or more audio sensors are configured to capture the at least one audio signal 141 used to determine a direction of arrival of sound from the sound source 140 relative to the user device 120. For example, the one or more audio sensors can comprise one or more microphone arrays. In other examples, the means 110 do not comprise the one or more audio sensors, and one or more audio sensors which are not part of the apparatus 100 provide the at least one captured audio signal 141 to the apparatus 100.

Figure 3A:
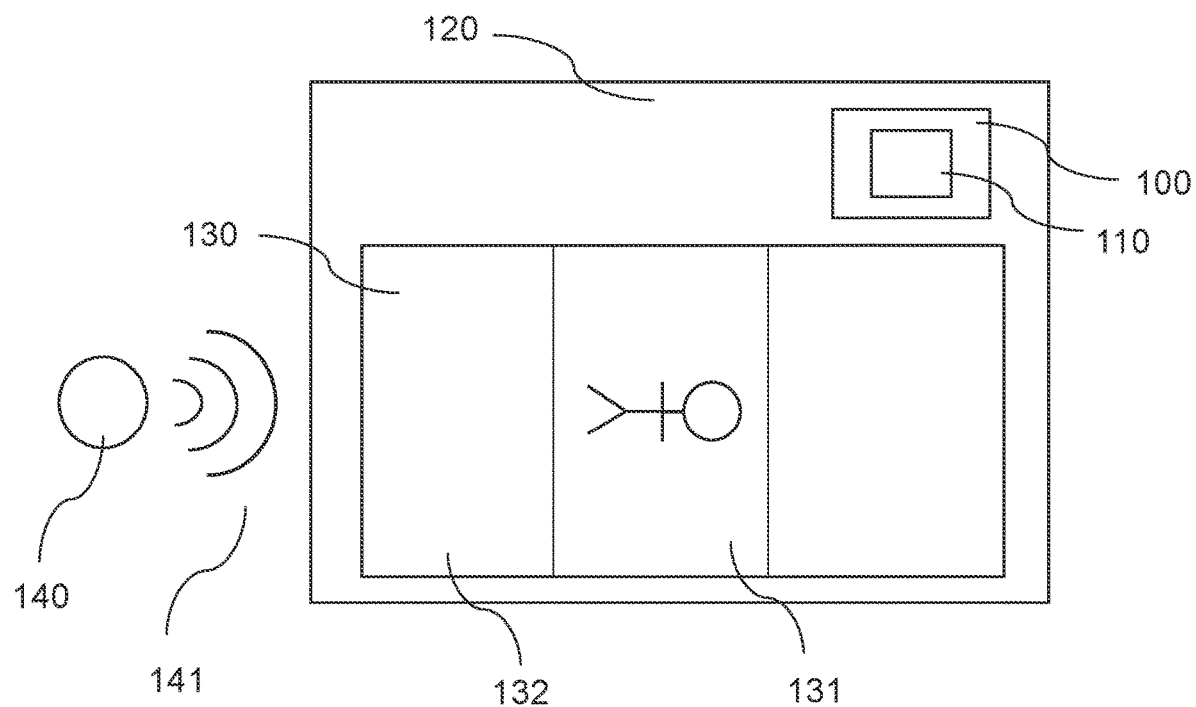
FIG. 3A shows an example of the subject matter described herein.
Figure 3B:
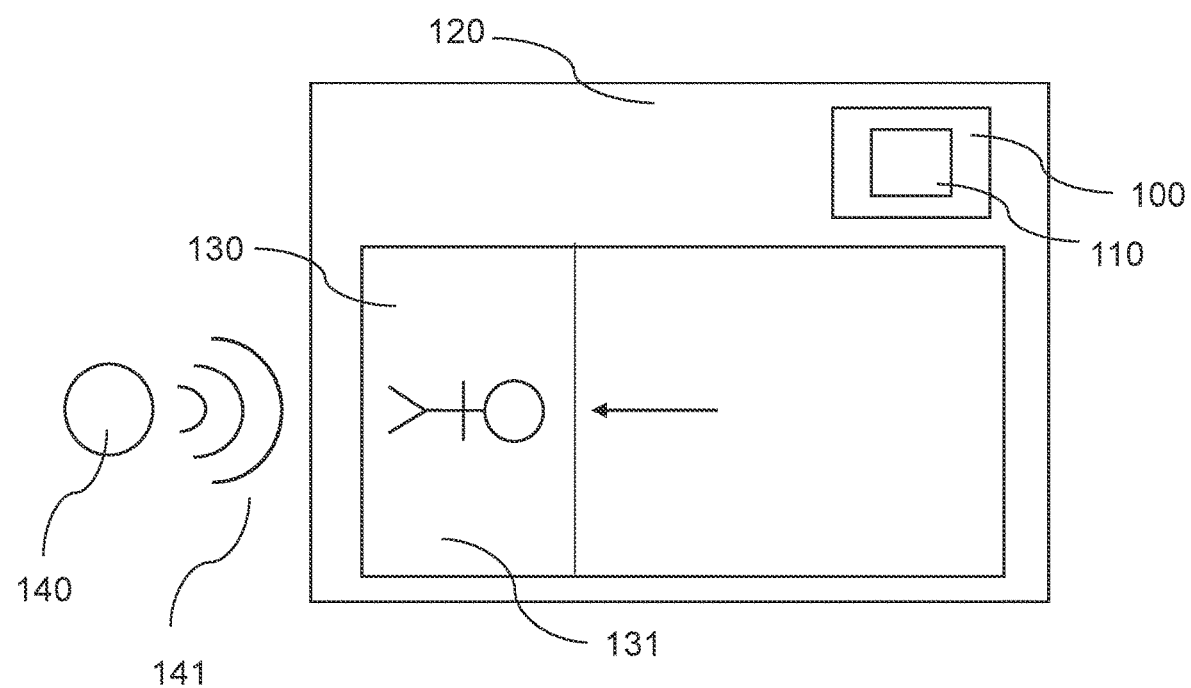
FIG. 3B shows an example of the subject matter described herein.

FIG. 3A and FIG. 3B illustrate another example apparatus 100. In this example the apparatus comprises means 110 for controlling a position the visual information 131 is displayed at on the display 130. The position that the visual information is displayed at is at least partially dependent upon the determined direction of arrival of sound from the sound source 140 relative to the user device 120.

The visual information 131 is at the angle of orientation illustrated in FIG. 3A either due to already being at that angle of orientation before the direction of arrival of sound from the sound source 140 is determined, or it can be that the angle of orientation of the visual information has changed to that illustrated in FIG. 3A due to the determined direction of arrival of sound from the sound source 140.

As illustrated in FIG. 3A, there is space 132 available on the display which is closer to the sound source 140 than the position of the visual information 131 in FIG. 3A. In FIG. 3B the position of the visual information 131 has changed to occupy at least some of the space 132, as illustrated by the arrow in FIG. 3B. This means that the visual information 131 is moved closer to the sound source 140. In some examples, the sound source 140 is a user and this provides better visibility of the visual information 131 to the user.

In some examples the angle of orientation of the visual information 131 can be changed before a change to the position of the visual information 131. In some examples the position that the visual information 131 is displayed at on the display 130 can be changed before a change to the angle of orientation of the visual information 131. In some examples the position of the visual information 131 can be changed at the same time as the angle of orientation of the visual information 131.

In some examples, user interface controls are associated with the visual information 131. For example, if the visual information 131 is video, associated user interface controls can be play/pause buttons and/or volume sliders, amongst others. In some examples, the apparatus 100 controls the user interface controls to be moved with the visual information when the position of the visual information 131 is changed.

Figure 4A:
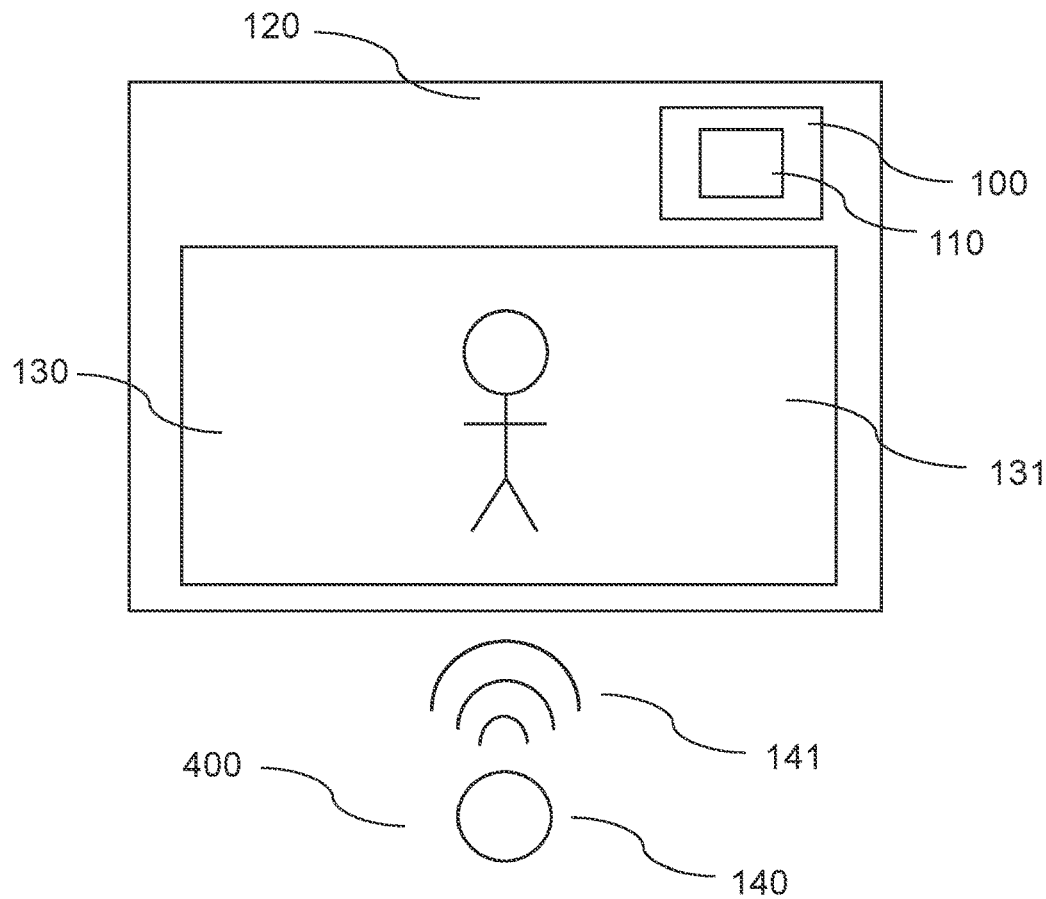
FIG. 4A shows an example of the subject matter described herein.
Figure 4B:
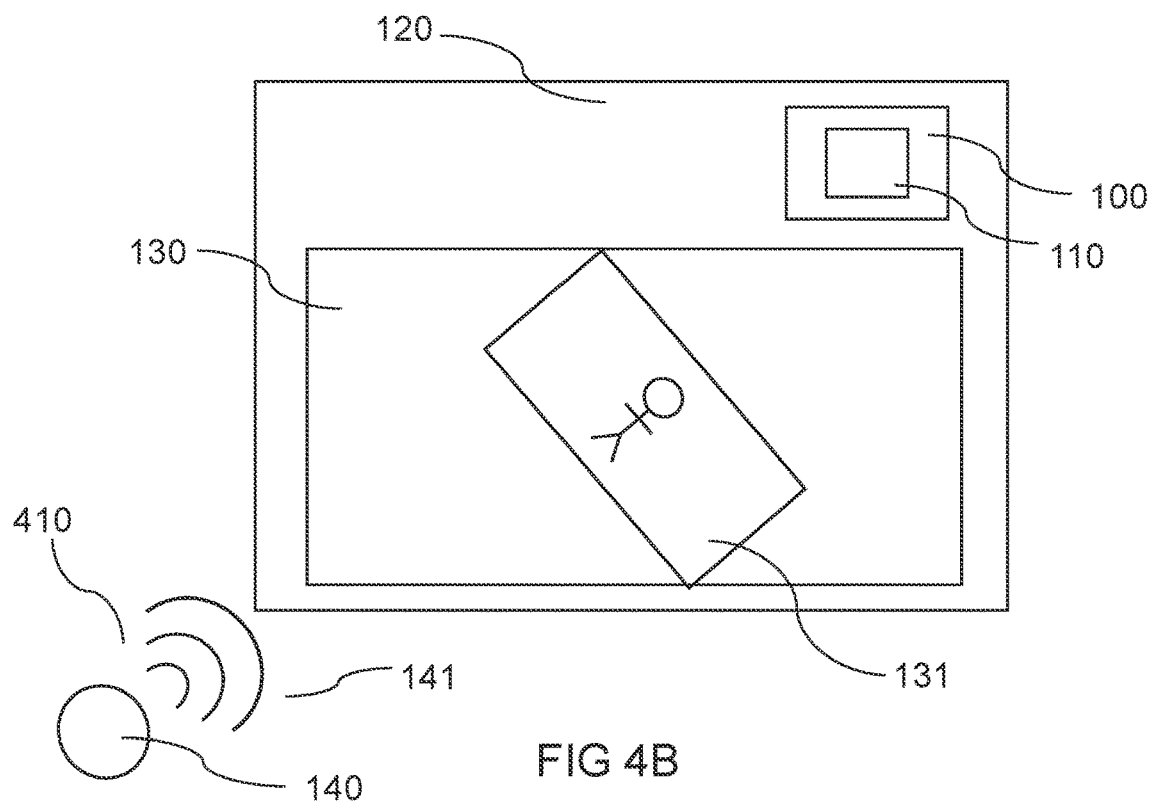
FIG. 4B shows an example of the subject matter described herein.
Figure 4C:
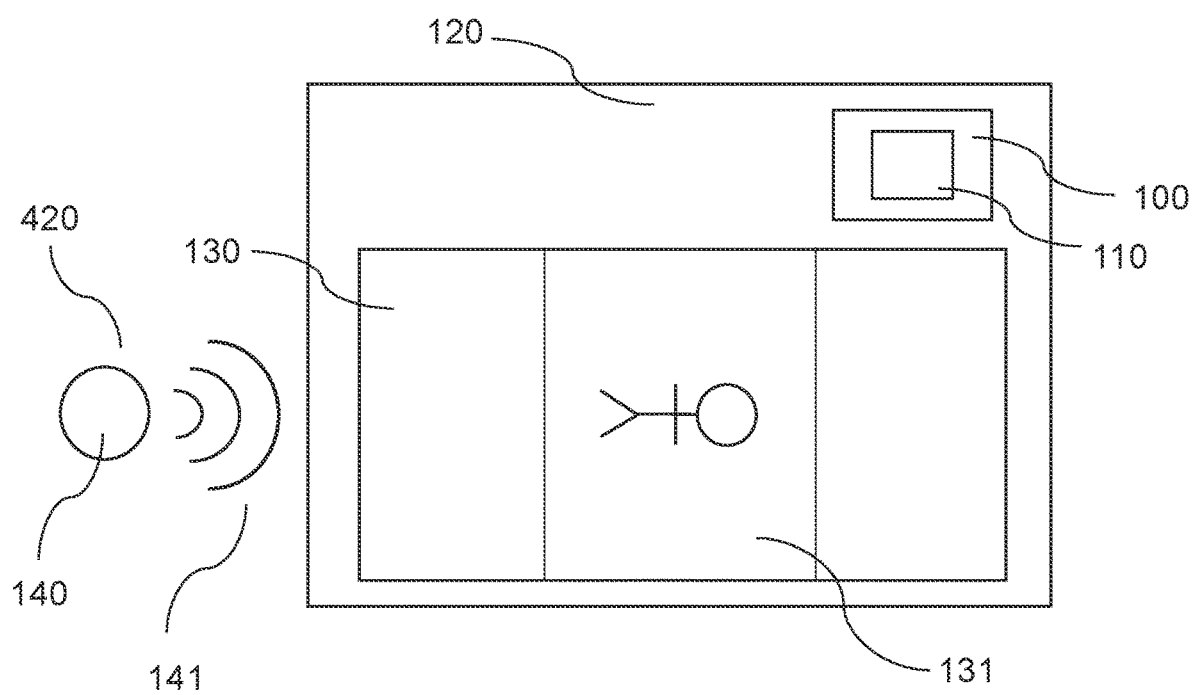
FIG. 4C shows an example of the subject matter described herein.

FIG. 4A, FIG. 4B and FIG. 4C illustrate another example apparatus 100.

In this example the apparatus 100 comprises means 110 for determining changes in the direction of arrival of sound from the sound source 140 relative to the user device 120. The means for determining the change in direction of arrival can be the same means 110 used to determine the direction of arrival as previously described. The means for controlling the angle of orientation of the visual information 131 displayed on the display 130 correspondingly changes the angle of orientation of the visual information 131 in response to a determined change in the direction of arrival sound from the sound source.

As illustrated in FIG. 4A, FIG. 4B and FIG. 4C, the position of the sound source 140 changes from position 400 in FIG. 4A, to position 410 in FIG. 4B and to position 420 in FIG. 4C. This causes changes in the determined direction of arrival of sound from the sound source 140 relative to the user device 120. In response to a determined change in direction of arrival of sound from the sound source 140, a corresponding change in the angle of orientation of the visual information 131 occurs. By rotating the visual information 131 in this manner, the apparatus 100 targets maintaining the alignment of the angle of orientation of the visual information 131 relative to the determined direction of arrival of sound from the sound source 140.

In some examples, the sound source 140 is a user. By maintaining the alignment of the angle of orientation of the visual information 131 relative to the determined direction of arrival of sound from the sound source 140, this provides the benefit of the user perceiving that the visual information 131 rotates with them as they rotate around the display 130, which in this example is part of the user device 120. The user therefore observes the visual information 131 at substantially the same orientation regardless of their position around the display 130.

This is beneficial in many situations. For example, where the visual information 131 comprises a map, it can be beneficial for the angle of orientation of the map to maintain its alignment with the determined direction of arrival of sound from the user so that it is easier for the user to read the map whilst rotating around the display 130. It can be useful where another user shares a real time feed of their location that is shown on the map which forms the visual information 131, with the user tracking the location of the other user. By maintaining alignment of the angle of orientation of the map relative to the determined direction of arrival of sound from the user viewing the map, it is easier for the user to follow the location of the other user, particularly as they change direction and/or location on the map.

In another example, if the visual information 131 is text that the user is reading off the display. Maintaining the alignment of the angle of orientation of the visual information 131 relative to the determined direction of arrival of sound from the user enables the user to continue reading the visual information 131 without difficulty as they change their position around the display 130.

Figure 5A:
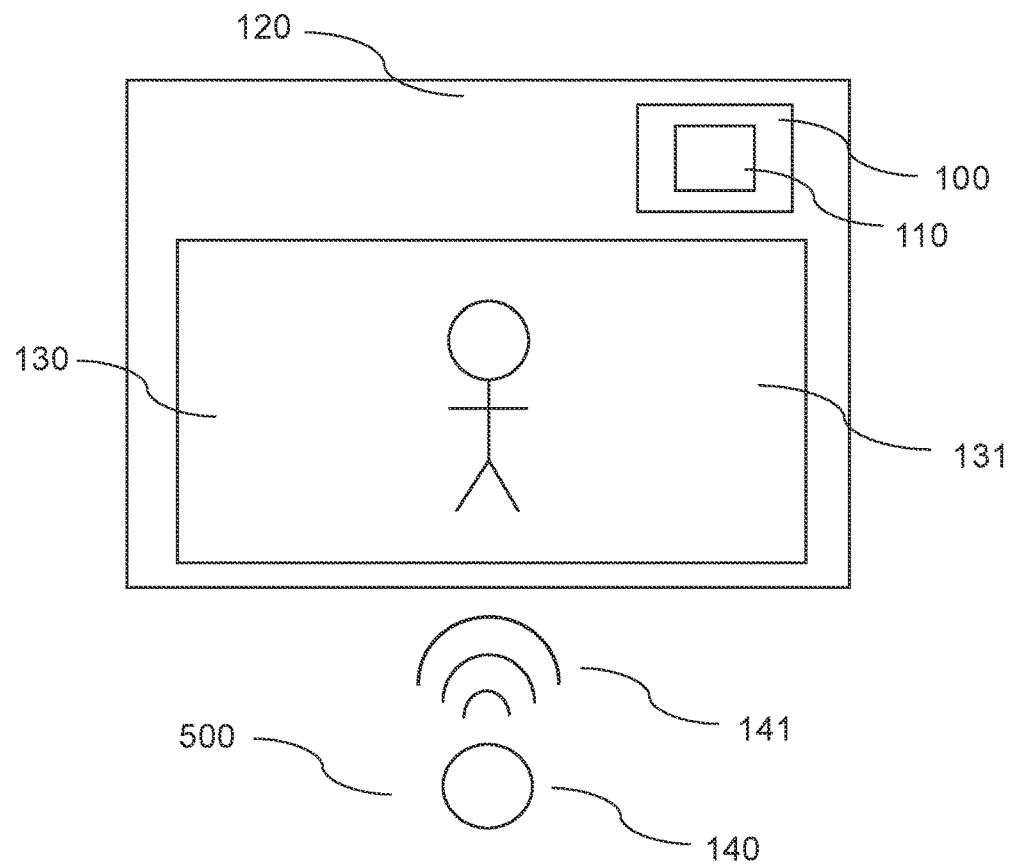
FIG. 5A shows an example of the subject matter described herein.
Figure 5B:
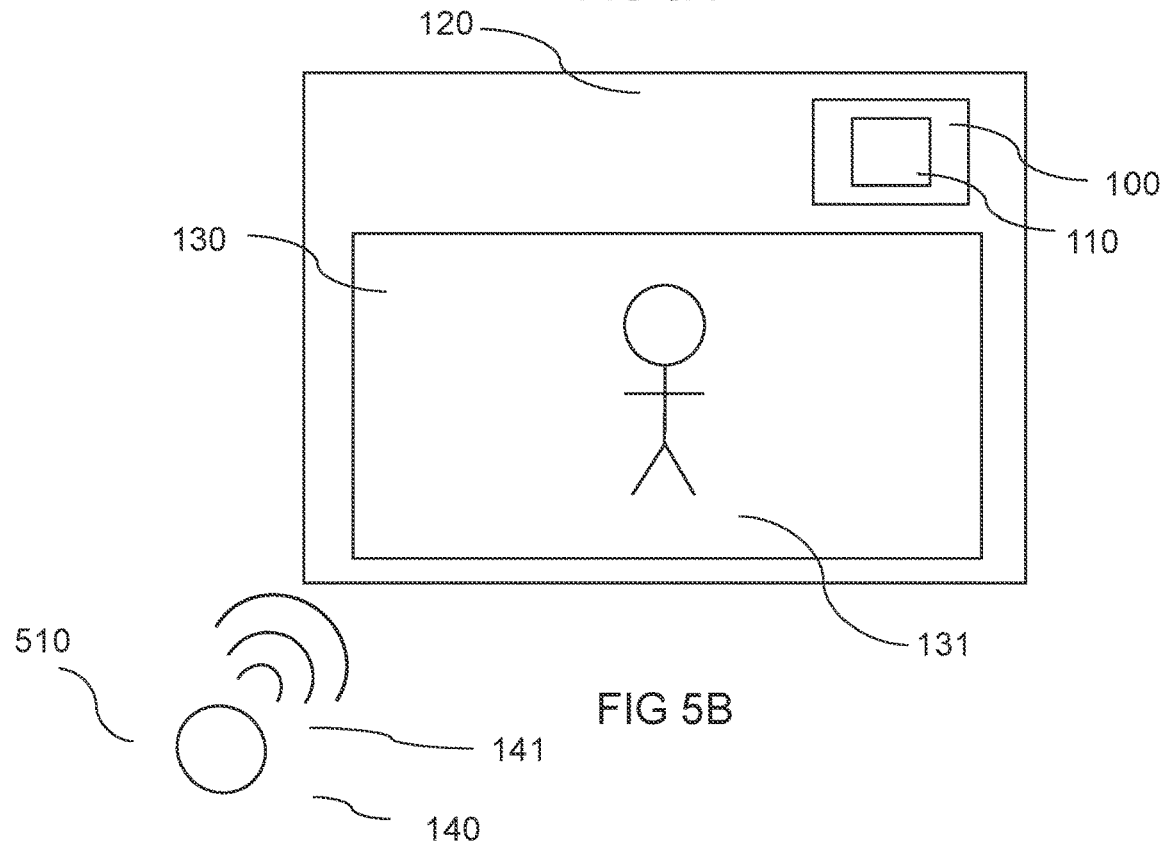
FIG. 5B shows an example of the subject matter described herein.
Figure 5C:
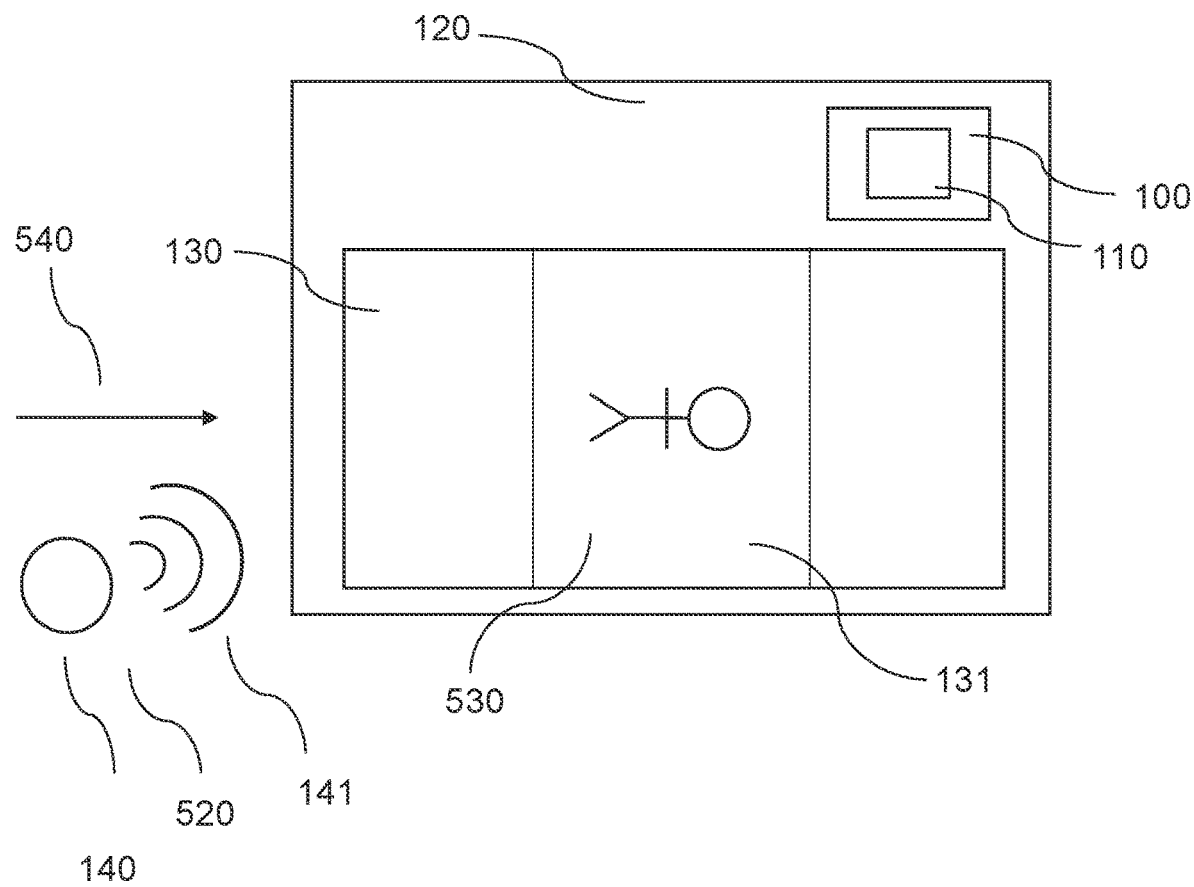
FIG. 5C shows an example of the subject matter described herein.

FIG. 5A, FIG. 5B and FIG. 5C illustrate another example apparatus 100. In this example the apparatus 100 changes the angle of orientation of the visual information 131 to a predefined angle 530 after determining that the determined direction of arrival of sound from the sound source 140 satisfies a threshold direction of arrival associated with the predefined angle 530. As illustrated in FIG. 5A the visual information 131 is at a first angle of orientation. In this example the sound source 140 is positioned at a first location 500. In FIG. 5B, the position of the sound source 140 has changed to position 510 and the determined direction of the arrival of sound from the sound source 140 has changed, however the angle of orientation of the visual information 131 has not changed. This is because the determined direction of arrival of sound from the sound source 140 in FIG. 5B does not meet the threshold for changing the angle of orientation of the visual information 131 to the predefined angle 530 of orientation illustrated in FIG. 5C. In FIG. 5B, the determined direction of arrival of sound from the sound source 140 is still within the threshold associated with the angle of orientation of the visual information illustrated in FIG. 5A.

In FIG. 5C, the position of the sound source 140 has changed to position 520 and the determined direction of arrival of sound from the sound source 140 has changed. In FIG. 5C, the determined direction of arrival of sound from the sound source 140 satisfies the threshold direction of arrival which is associated with the predefined angle 530 of orientation of the visual information 131 illustrated in FIG. 5C. As illustrated in FIG. 5C the angle of orientation of the visual information has changed to the predefined angle 530, which in this example is at 90° relative to the angle of orientation illustrated in FIG. 5A.

In this example, the user device 120 is parallel to the surface of the earth, and the reference plane of the azimuth is the surface of the earth. The threshold direction of arrival is that the direction of arrival is less than 45° in the azimuth in either direction relative to the reference direction of arrival illustrated by arrow 540, which is perpendicular to the edge of the user device 120 nearest the arrow 540. In other examples, the threshold direction of arrival associated with the predefined angle 530 of orientation is different. In some examples, there can be other predefined angles of orientation at which the visual information is rotated to. For example, the visual information 131 can be presented at predefined angles of orientation with increments of 90°, in accordance with the example illustrated in FIG. 5A, FIG. 5B and FIG. 5C. In other examples, the predefined angles of orientation can be spaced by other increments, for example 45° increments.

Figure 6A:
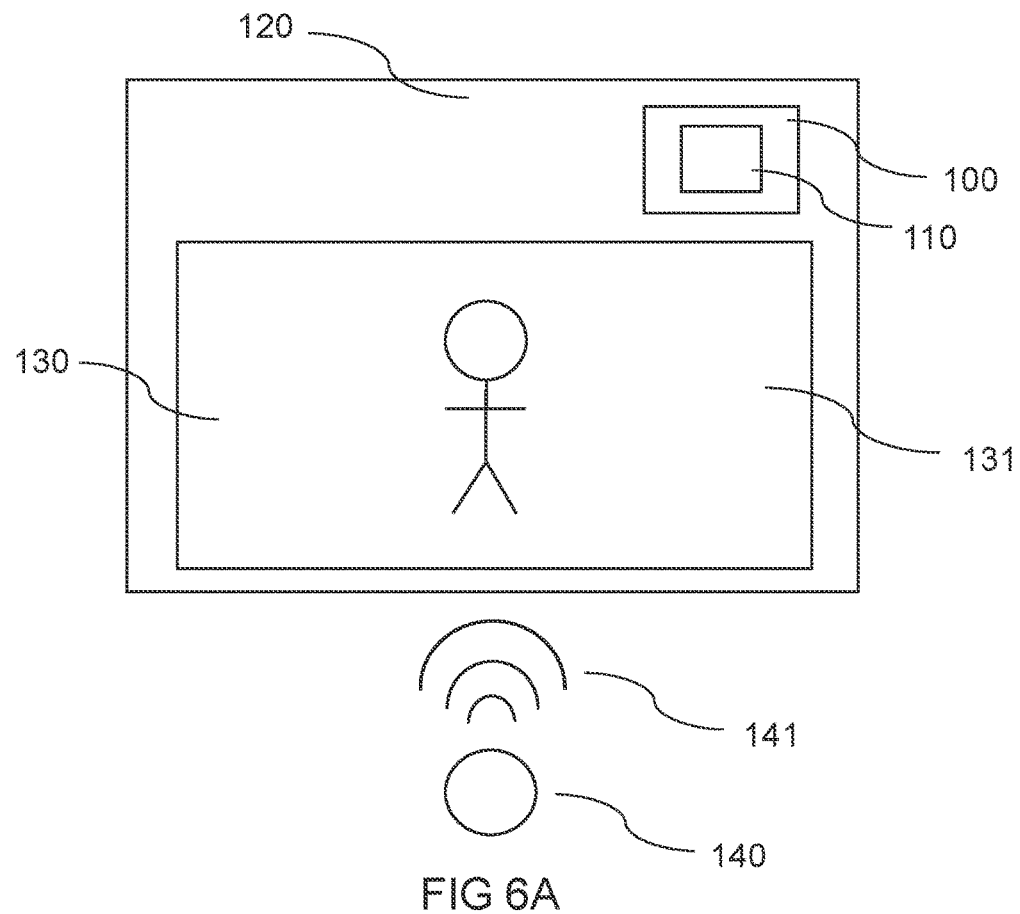
FIG. 6A shows an example of the subject matter described herein.
Figure 6B:
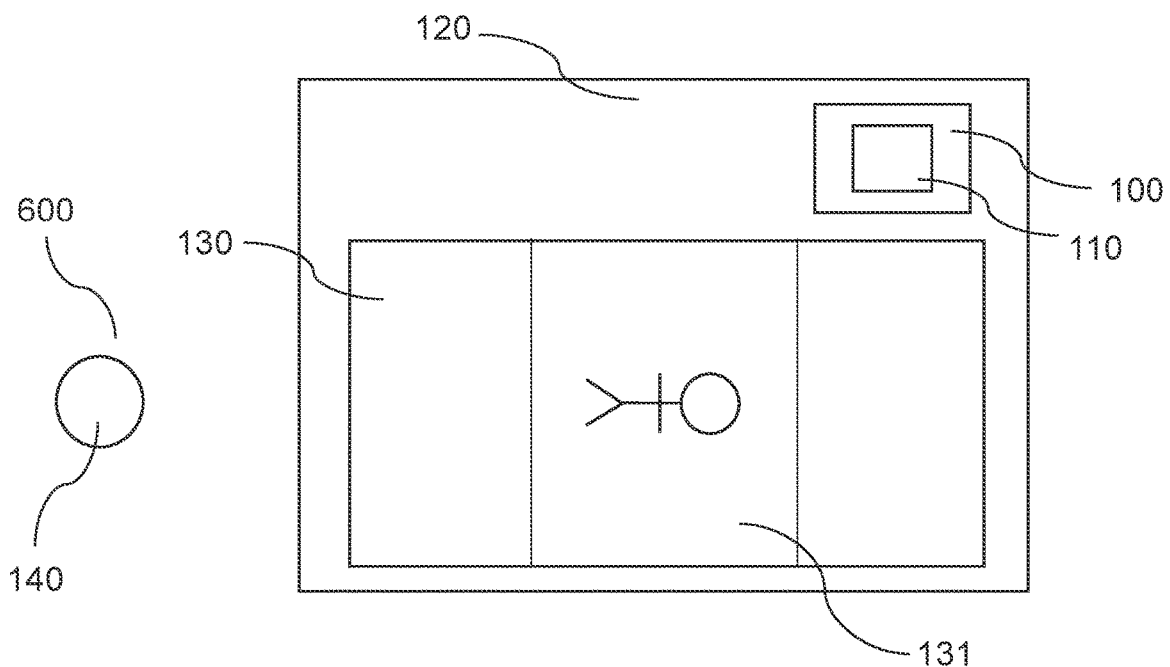
FIG. 6B shows an example of the subject matter described herein.

FIG. 6A and FIG. 6B illustrate an example apparatus 100. In this example the apparatus comprises means for: estimating a location 600 of the sound source 140 relative to the user device 120 whilst the sound source 140 is not producing sound; and wherein the angle of orientation of the visual information 131 is at least partially dependent upon the estimated location 600 of the sound source 140 relative to the user device 120 whilst the sound source 140 is not producing sound.

The means 110 can comprise the means for estimating the location of the sound source 140 or it can be provided separately to the apparatus 100.

The means can comprise a camera. The apparatus 100 can determine that an object detected by the camera is the sound source 140. Any suitable method can be used to detect the sound source 140 using the camera. For example, if the sound source 140 is a user's voice, the camera can be used to detect the face of the user. The apparatus can determine that the detected face is associated with the user's voice, and therefore that the detected face is associated with the sound source 140. The apparatus can determine the direction of the user's face, and estimate the distance of the user's face from the user device 120, to estimate the location of the sound source 140.

In another example the means for estimating the location 600 comprises an Ultra Wide Band (UWB) device. The UWB device is configured to receive signals from another UWB device which indicates the location 600 of the sound source 140. For example, the sound source 140 can have a UWB device associated with it which enables the position of the sound source 140 relative to the user device 120 to be determined. In some examples the UWB device associated with the sound source 140 is a mobile device.

The examples illustrated in FIG. 6A and FIG. 6B provide the advantage that the location 600 of the sound source 140 can be estimated even whilst the sound source 140 does not produce sound. This enables the angle of orientation of the visual information 131 to be controlled using the sound source's position, and does not rely upon the sound source continuously making sounds or requiring the sound source 140 to make sound to change the angle of orientation of the visual information 131.

Figure 7A:
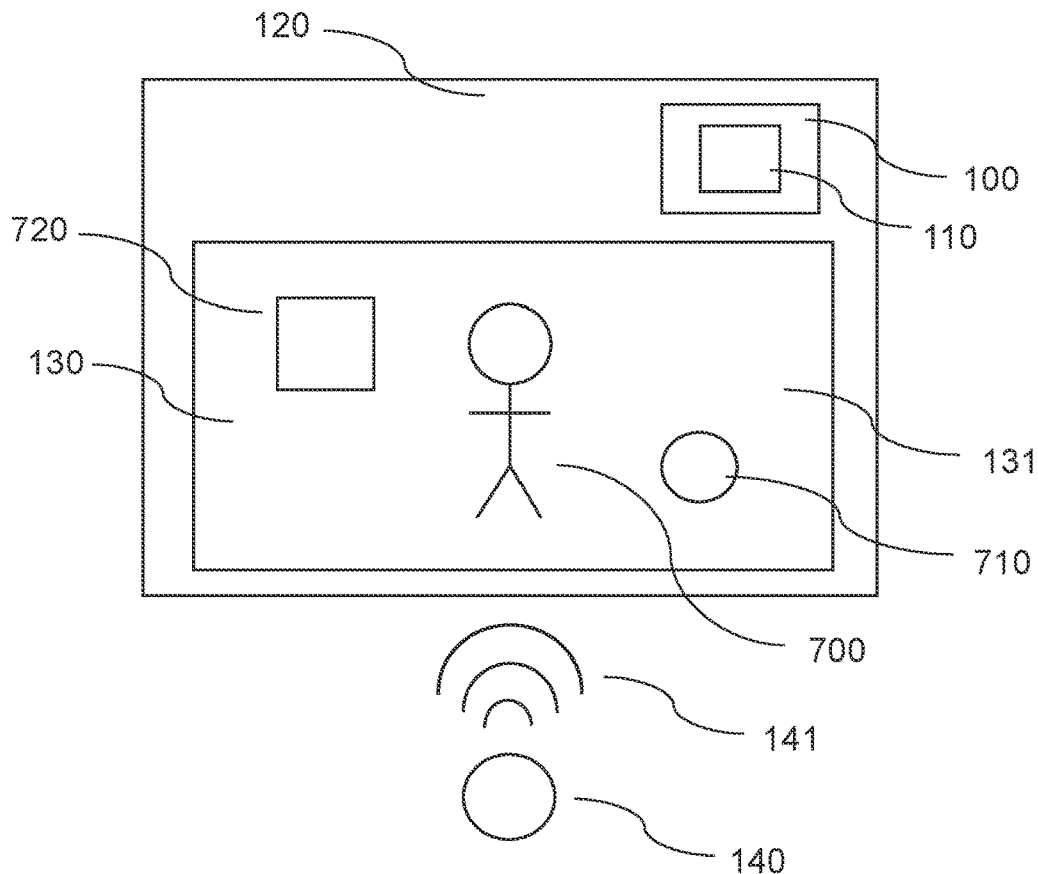
FIG. 7A shows an example of the subject matter described herein.
Figure 7B:
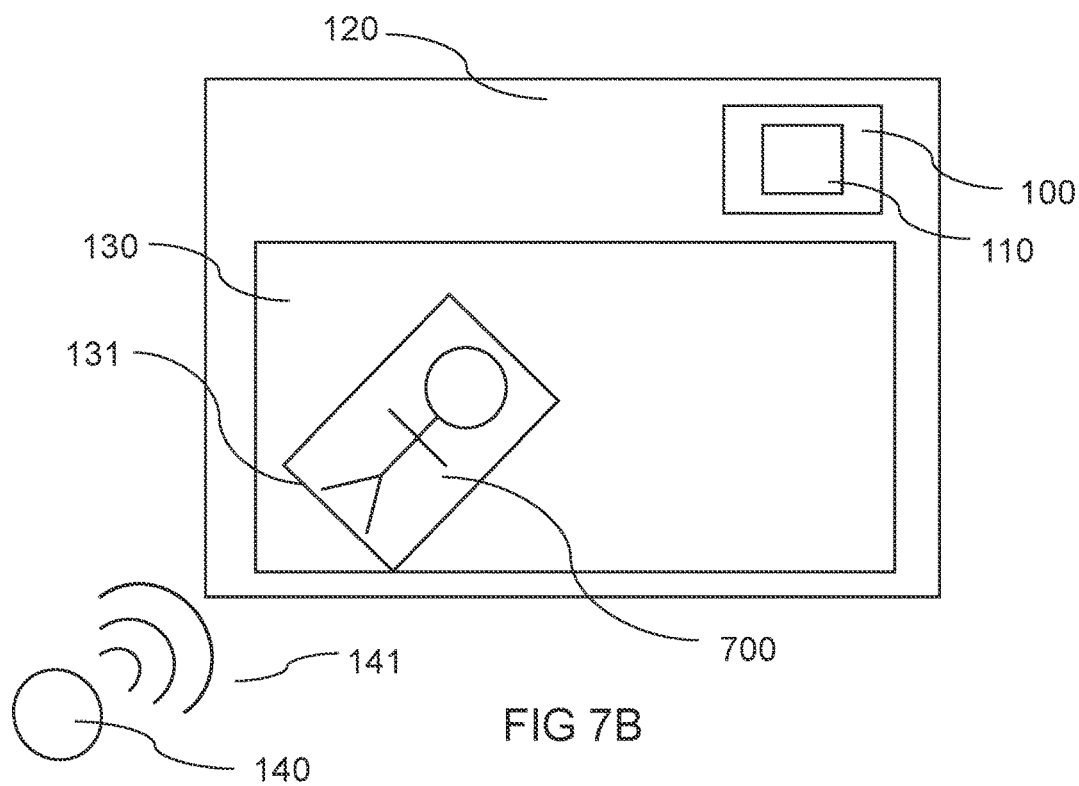
FIG. 7B shows an example of the subject matter described herein.

FIG. 7A and FIG. 7B illustrate another example apparatus 100. In this example the angle of orientation of the visual information 131 is changed in response to determining a change in the direction of arrival of sound from the sound source 140 as illustrated in FIG. 7B. In this example the apparatus 100 comprises means 110 for cropping the visual information 131. The cropping is at least partially dependent upon the angle of orientation of the visual information 131. In FIG. 7A, the visual information 131 displayed includes objects 700, 710, 720. As illustrated in FIG. 7B, the angle of orientation of the visual information 131 has changed in response to determining a change in the direction of arrival of sound from the sound source 140. In this example, the position of the visual information 131 on the display has also been changed in response to determining a change in the direction of arrival of sound from the sound source 140. To maintain the scale of object 700 between FIG. 7A and FIG. 7B, the visual information 131 has been cropped, so that objects 710, 720 and other portions of the visual information 131 in FIG. 7A are no longer displayed. The cropping is at least partially dependent upon the angle of orientation of the visual information 131. In this example, it is also dependent upon the position of the visual information 131 in the display.

The means 110 for cropping the visual information 131 may determine that a particular portion of the visual information is of interest according to predefined settings and should be maintained after cropping. For example, in FIG. 7B, the means for cropping recognizes that object 700 is a person and should be maintained in the visual information 131 after cropping. This can be beneficial, for example, if the visual information 131 relates to a video call.

In some examples, the visual information 131 is cropped based on having the best fit depending upon the type of visual information 131.

In some examples, the apparatus 100 comprises means 110 for altering a scale of the visual information 131. The altering of the scaling of the visual information is at least partially dependent upon the angle of orientation of the visual information 131. For example, if it is desired to maintain the entire visual information 131 on the display 130 as it is rotated, the visual information 131 may need to be reduced in size. The altering of the scaling of the visual information 131 can also be dependent upon the position of the visual information 131 on the display 130.

In some examples, an application associated with the visual information 131 can comprise built-in logic which determines how the visual information 131 should be cropped and/or how the aspect ratio and/or zooming of the visual information 131 should be controlled depending on the angle of orientation of the visual information 131 and/or the position of the visual information 131 on the display.

Figure 8A:
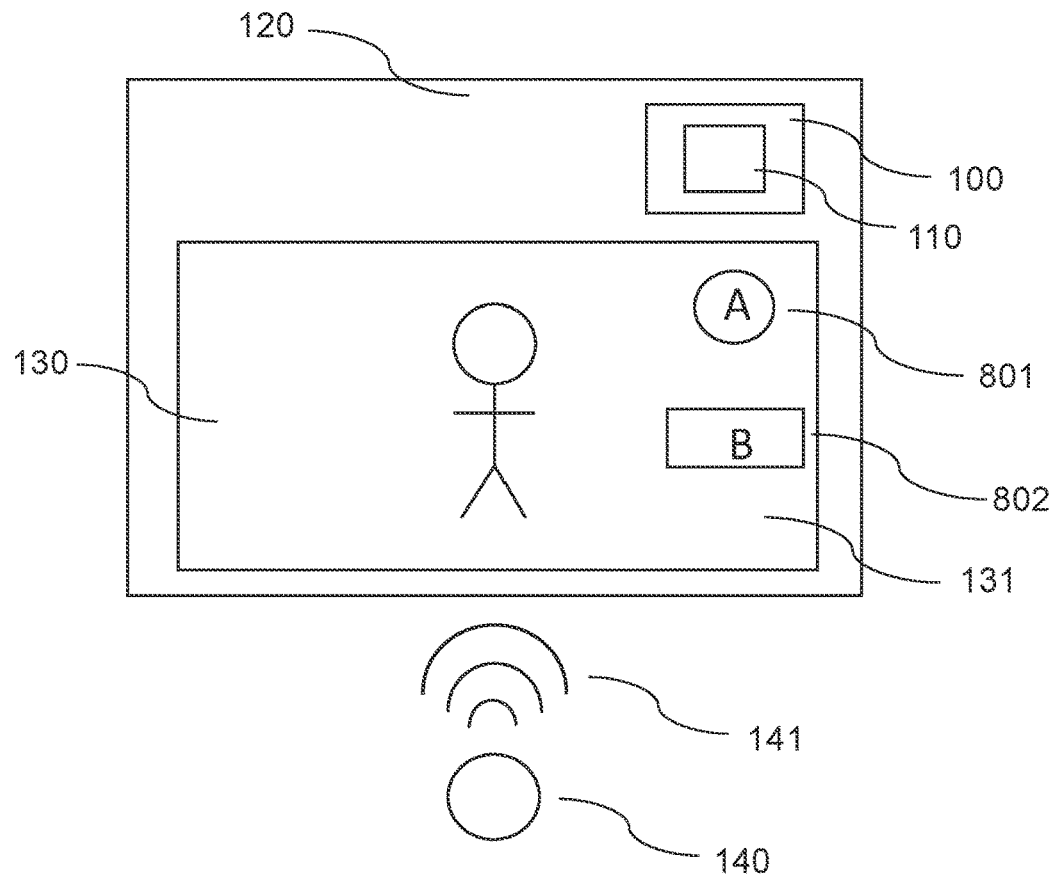
FIG. 8A shows an example of the subject matter described herein.
Figure 8B:
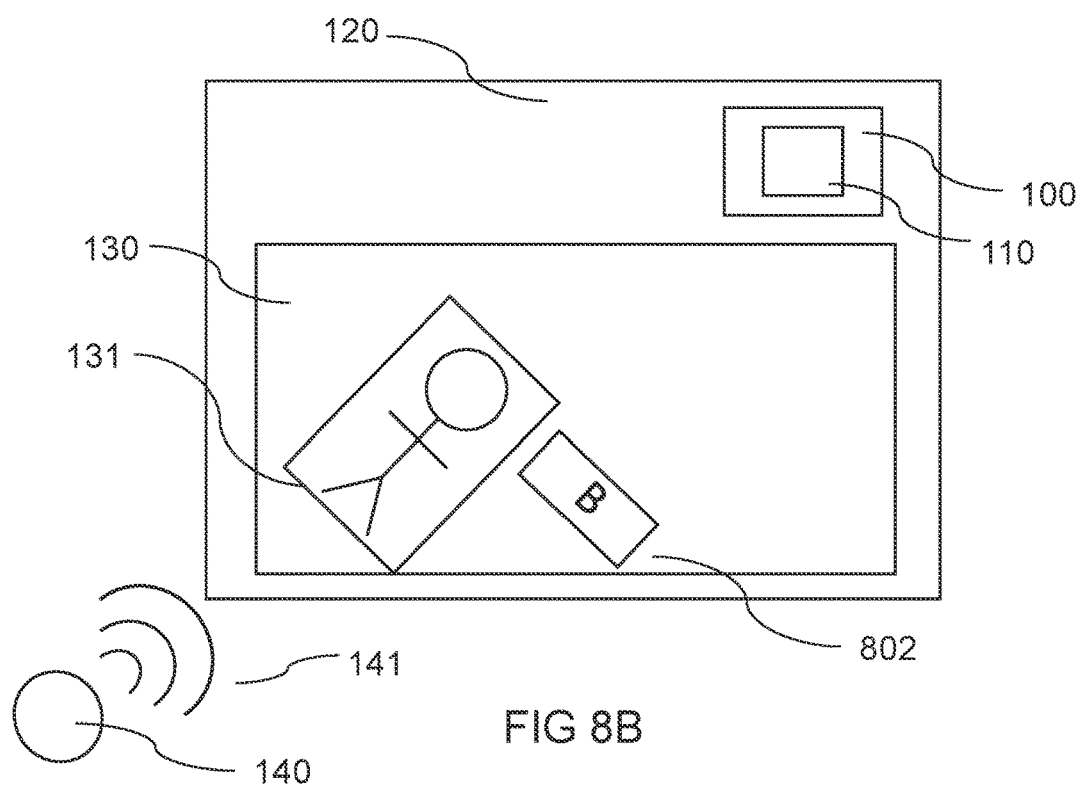
FIG. 8B shows an example of the subject matter described herein.

FIG. 8A and FIG. 8B illustrate another example apparatus 100. In this example, user interface controls 801, 802 are displayed on the display 130. The user interface controls 801, 802 are associated with the visual information 131 displayed on the display 130. In this example the apparatus 100 comprises means 110 for adjusting a position and/or orientation of the user interface controls 801, 802, wherein the adjusting is at least partially dependent upon the angle of orientation of the visual information 131. For example, as illustrated in FIG. 8A, the user interface controls 801, 802 overlay the visual information 131. In FIG. 8B, the position of the user interface control 802 has been changed so that it no longer overlays the visual information and the orientation of the user interface control 802 has been adjusted so that it is displayed at the same angle of orientation as the visual information 131. In this example, user interface control 801 is not displayed on the display in FIG. 8B. This is because the user interface control 802 was prioritized for being displayed in the space available close to the visual information 131. In other examples, the user interface controls 801, 802 can be resized or positioned otherwise so that both user interface controls 801, 802 are displayed in a space next to the visual information 131.

In the example of FIG. 8B, the visual information 131 has been cropped, and by presenting the user interface control 802 so that it no longer overlays the visual information 131, this provides the advantage that the portion of visual information 131 displayed on the display is maximized to enable better presentation of the visual information to the user whilst maintaining user interface control 802. In other examples the visual information 131 is not cropped, but the means 110 can determine that there is space on the display 130 close to the visual information 131 to place the user interface controls 801, 802 in a convenient position for the user whilst enabling better presentation of the visual information to the user.

Figure 9A:
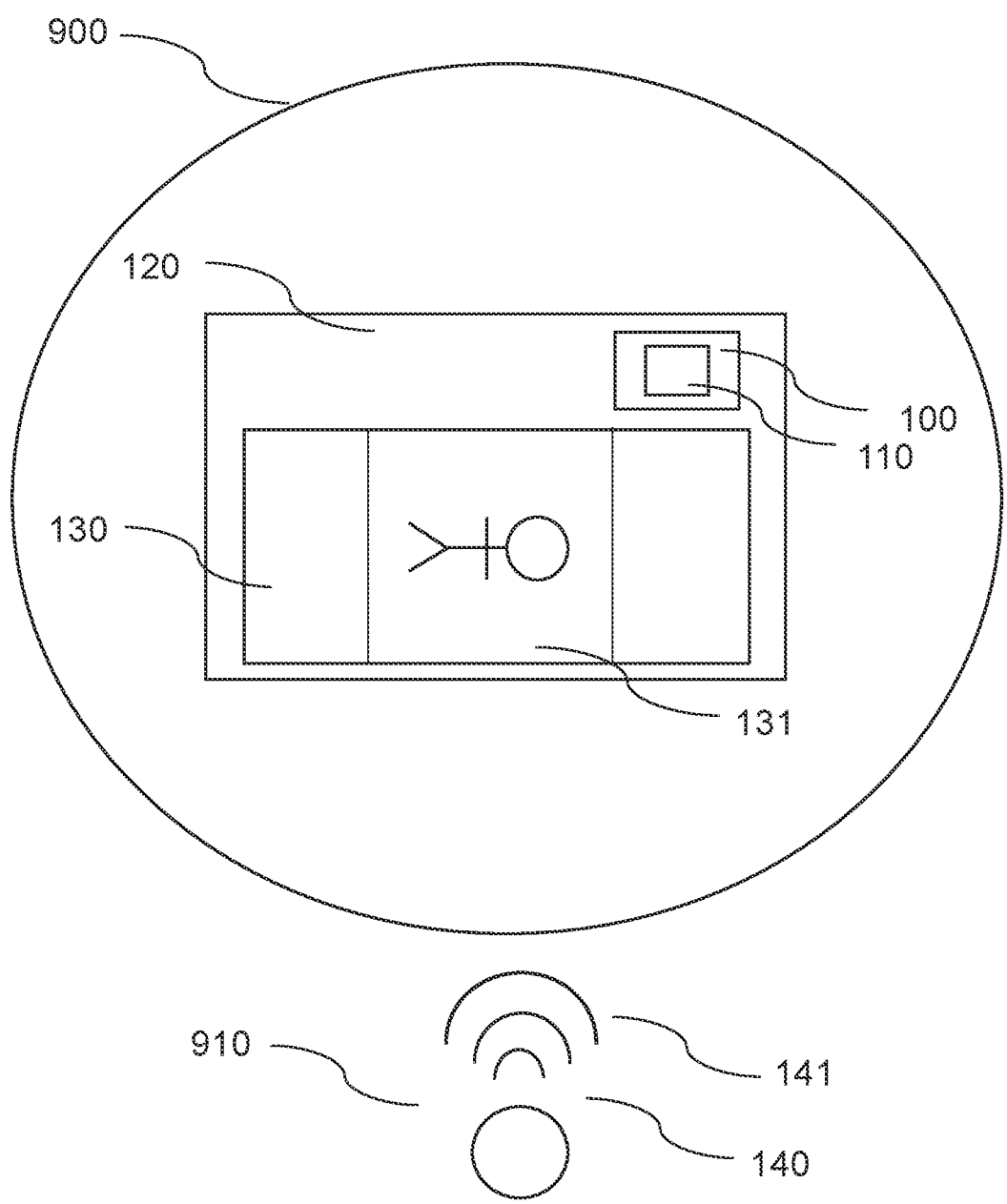
FIG. 9A shows an example of the subject matter described herein.
Figure 9B:
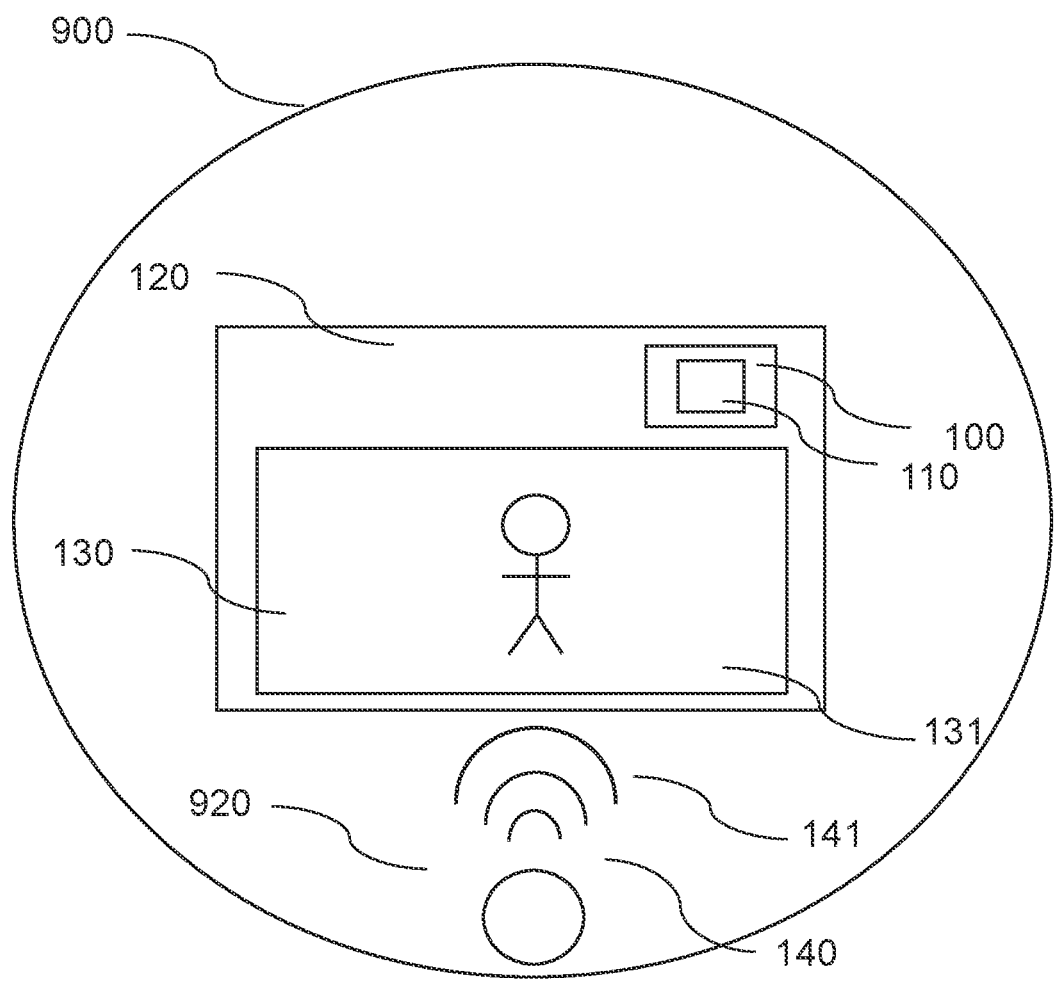
FIG. 9B shows an example of the subject matter described herein.

FIG. 9A and FIG. 9B illustrate another example apparatus 100. In this example, the apparatus comprises means 110 for: determining a distance of the sound source 140 from the user device 120; preventing changing of the angle of orientation of the visual information 131 displayed on the display 130 if the determined distance of the sound source 140 is greater than a threshold distance 900 from the user device 120.

As illustrated in FIG. 9A, the sound source 140 is determined to be at a distance 910 from the user device 120 that is greater than the threshold distance 900. Therefore, no change in the angle of orientation of the visual information 131 takes place.

In FIG. 9B, the determined distance 920 of the sound source 140 from the user device 120 is within the threshold distance 900, and therefore the angle of orientation of the visual information 131 displayed on the display has changed, wherein the change depends at least partially upon the determined direction of arrival of sound from the sound source 140 relative to the user device 120 and the determined distance of the sound source 140 being less than or equal to the threshold distance 900.

To determine the distance of the sound source 140 from the user device 120, the apparatus 100 can comprise means 110 to determine a direct-to-ambience measurement from the at least one captured audio signal 141. For example, the ambience increases compared to the direct sound the further the sound source 140 is from the one or more audio sensors used to capture the at least one audio signal. Direct-to-ambience measurements are often calculated when capturing spatial audio, and so in some examples the direct-to-ambience measurement can be calculated alongside determining the direction of arrival of sound from the sound source 140.

In some examples, the sound source 140 is a user voice. In some examples, the voice energy level at typical speech frequencies can be used to estimate the distance of the sound source 140 from the user device 120, such that voice signals below a pre-set or adaptive energy threshold would not be considered relevant and the apparatus 100 would not react to those to control the angle of orientation of the visual information 131.

In some examples, to estimate the distance of the sound source 140 from the user device 120, deep learning could be applied. For example, spectrum features of the at least one captured audio signal 141 are extracted and used in estimating the sound source 140 distance.

Figure 10A:
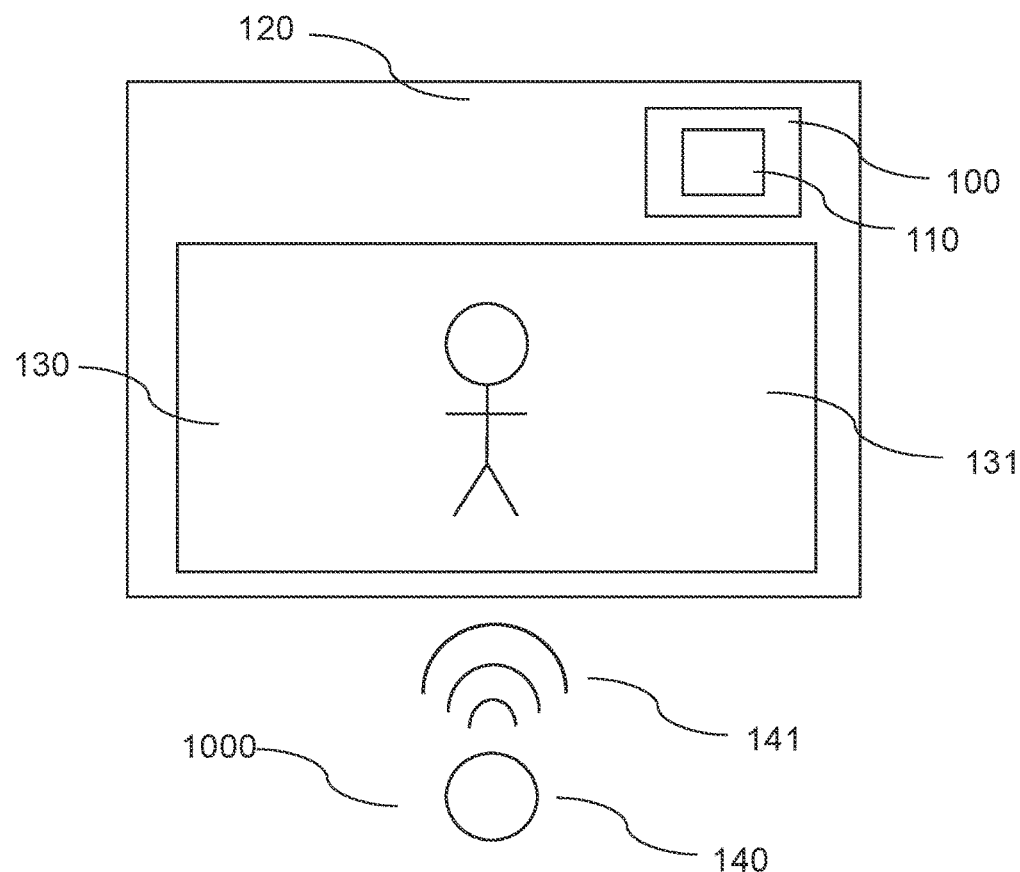
FIG. 10A shows an example of the subject matter described herein.
Figure 10B:
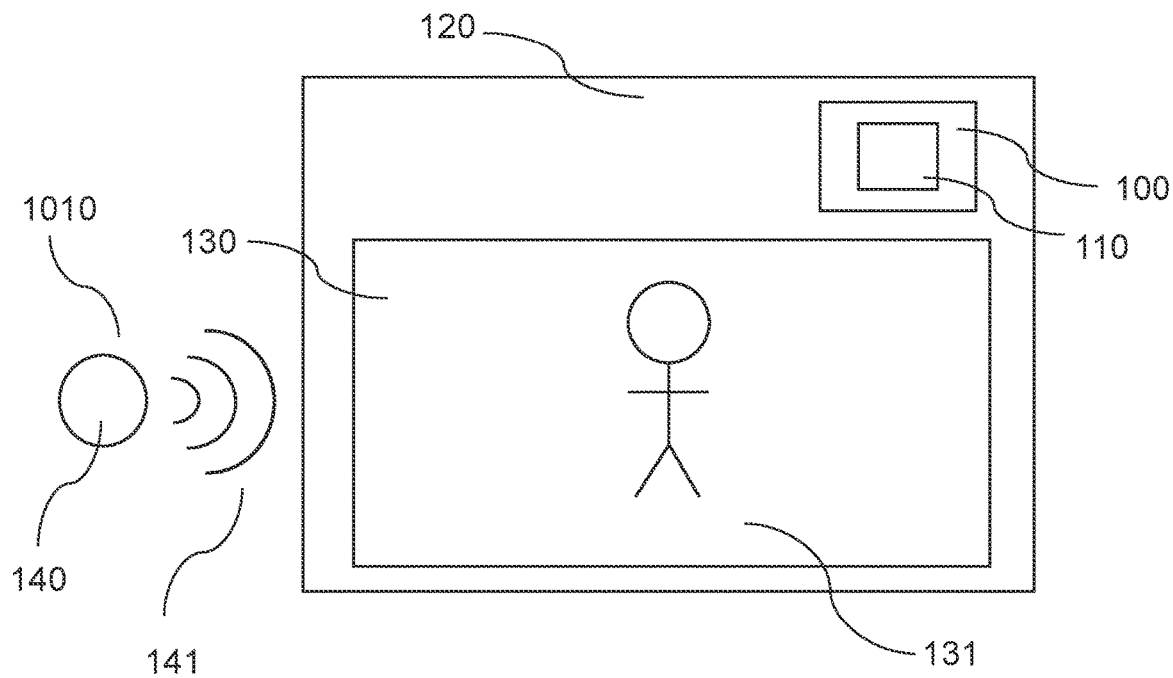
FIG. 10B shows an example of the subject matter described herein.

FIGS. 10A and 10B illustrate another example apparatus 100. In this example, the angle of orientation of the visual information 131 displayed on the display 130 additionally depends upon the application settings of an application running on the display 130. The application is associated with the visual information 131. In the example illustrated in FIG. 10A and FIG. 10B, the application has an option for rotation lock, so that any change in the determined direction of arrival of sound from the sound source 140 does not change the angle of orientation of the visual information 131 associated with the application until the option is deactivated. For example, as illustrated in FIG. 10A and FIG. 10B, the position of the sound source has changed from position 1000 to position 1010. The determined direction of arrival of sound from the sound source 140 has changed between FIG. 10A and FIG. 10B. The angle of orientation of the visual information 131 has not changed between FIG. 10A and FIG. 10B.

The application can have settings which specify a threshold change in angle of the determined direction of arrival of sound from the sound source 140 before causing any change in the angle of orientation of the visual information 131. In some examples, the application can specify directions of arrival of the sound source and/or ranges of directions of arrival of the sound source that would cause a change in the angle of orientation of the visual information 131. In some examples the sound source 140 is a user's voice, and the application has settings so that recognized user voices cause changing of the angle of orientation of the visual information 131.

Figure 11A:
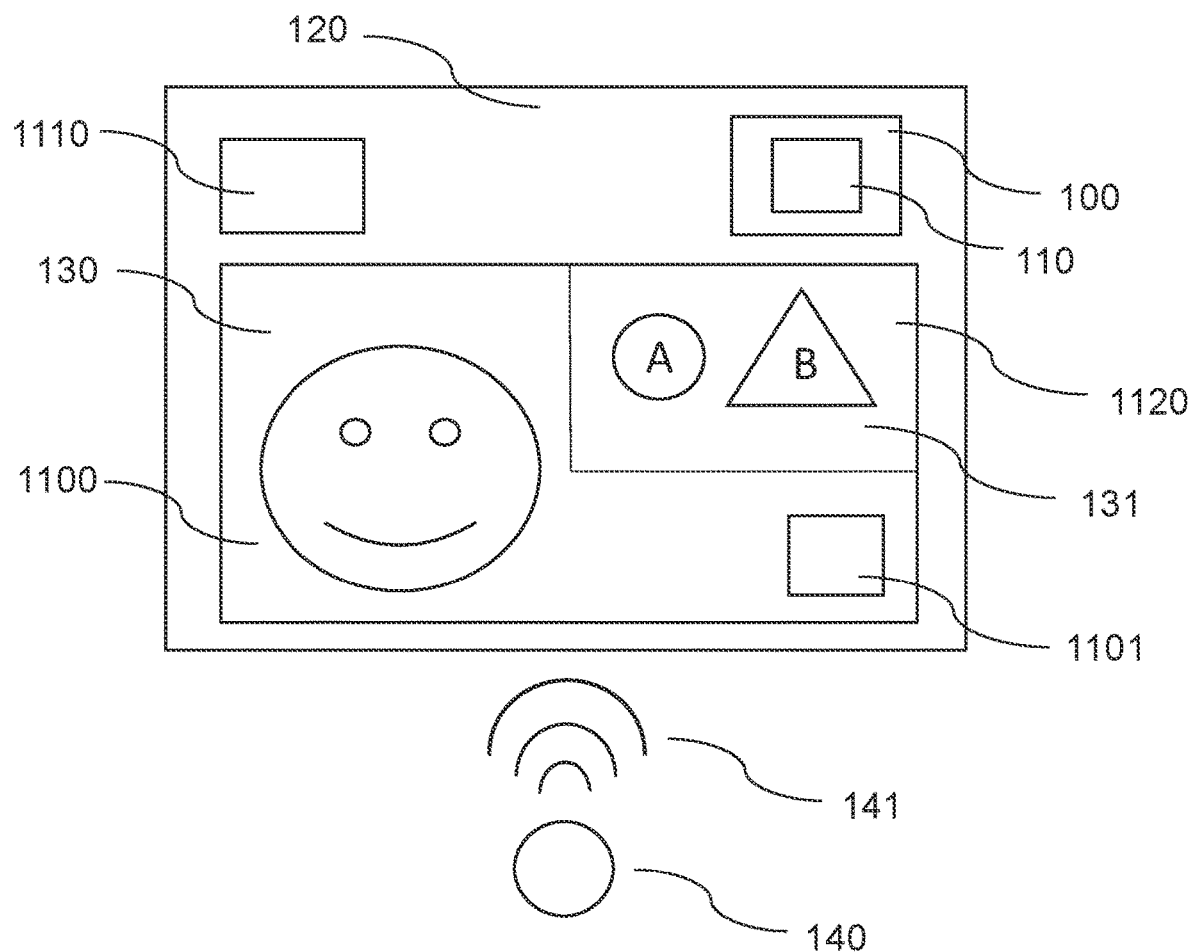
FIG. 11A shows an example of the subject matter described herein.
Figure 11B:
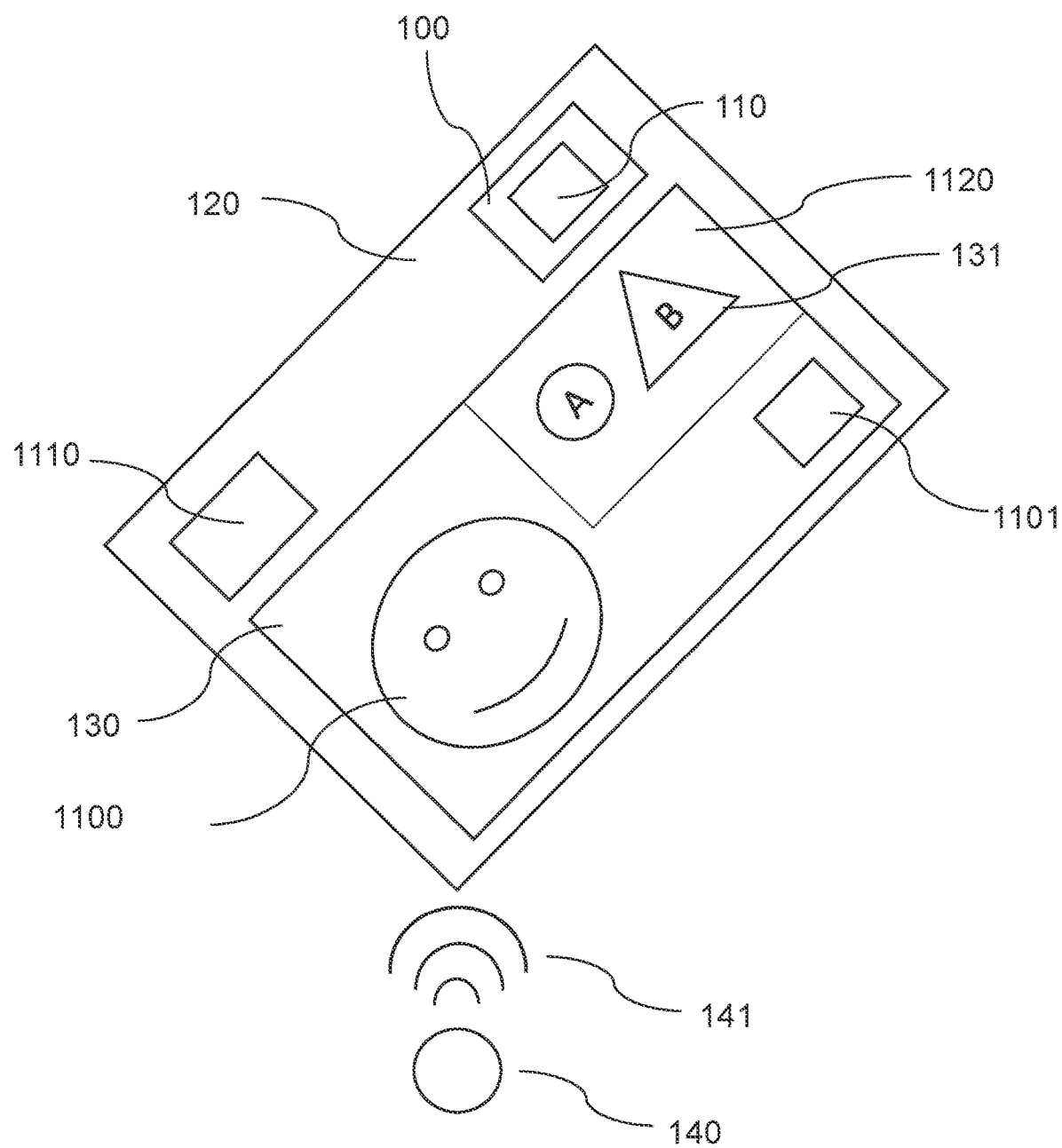
FIG. 11B shows an example of the subject matter described herein.

FIG. 11A and FIG. 11B illustrate another example apparatus 100. In this example the visual information 131 comprises one or more images and/or video captured by image capture means 1110 of the user device 120. In this example, the visual information 131 is displayed within window 1120. In this example, other visual information 1100 is also displayed on the display, as well as one or more user interface controls 1101.

In this example, if the user device 120 is rotated whilst the one or images and/or video is being captured, the means 110 for controlling the angle of orientation of the visual information 131 maintains the angle of orientation of the visual information 131 displayed on the display 130. This is done by determining the direction of arrival of sound from the sound source 140 relative to the rotated user device 120 to counteract any change to the angle of orientation of the visual information 131 displayed on the display 130 that could or does occur due to the rotation of the user device 120.

For example as illustrated in FIG. 11B, the user device 120 has been rotated. The angle of orientation of the visual information 131 on the display 130 has been maintained, in that it is at the same or substantially the same angle of orientation on the display 130 as it is in FIG. 11A before the rotation. The effect that rotating the user device 120 would normally have on the angle of orientation that the one or more images and/or video are displayed on the display 130 is therefore counteracted.

This would be beneficial, for example, where the visual information 131 is streamed to another user using another user device. In this example, the sound source 140 can be a user of the user device 120 streaming the visual information 131 to the other user. The user (sound source 140) may rotate the user device 120 whilst they are streaming, for example if they are holding the device they may change their grip resulting in rotation of the device. Without counteracting the effect that rotating the user device 120 could have on the angle of orientation of the streamed visual information, this could result in the other user becoming unsatisfied with the streamed visual information 131, for example it may be displayed at an angle of orientation on a display of the other user device that is not satisfactory to the other user.

In some examples, the apparatus maintains the angle of orientation that the visual information is displayed at on the display 130 as the user device 120 rotates by treating the position of the sound source 140 as a fixed point in space. Therefore if a change in the direction of arrival of sound from the sound source 140 is determined, the apparatus determines that the user device 120 has been rotated, and can determine what rotation has taken place. The position of the sound source 140 can be estimated or determined using any appropriate method.

In some examples, treating the position of the sound source 140 as a fixed point in space is activated by the user of the user device 120 instructing the apparatus. For example, the apparatus can recognize a voice control from the user or there can be a user interface control on the display 130. In some examples, an application associated with the visual information 131 instructs the apparatus 100 to treat the position of the sound source 140 as a fixed point in space.

In some examples, the visual information 131 represents a preview of visual information that is streamed to the other user on another user device, and represents the angle of orientation that the visual information will be displayed at on the display of the other user's device. In other examples, the display 130 does not display the visual information 131, and/or does not maintain the angle of orientation that the visual information is displayed at on the display 130. In these examples, the apparatus 100 can control the angle of orientation of the visual information 131 when it is displayed on the display of the other user's user device to counteract changes to the angle of orientation of the visual information displayed on the display due to the rotation of the user device 120.

In some examples, the angle of orientation of the other visual information 1100 and the one or more user interface controls 1101 on the display 130 do not change as the user device 120 is rotated. This can make it easier for the user to use the one or more user interface controls 1101 and to view the other visual information 1100 in some situations, for example if they are holding the user device 120. In other examples, the angle of orientation and/or position of the other visual information 1100 and/or the one or more user interface controls can be changed as the user device 120 rotates and/or if the determined direction of arrival of sound from the sound source 140 changes.

Figure 12A:
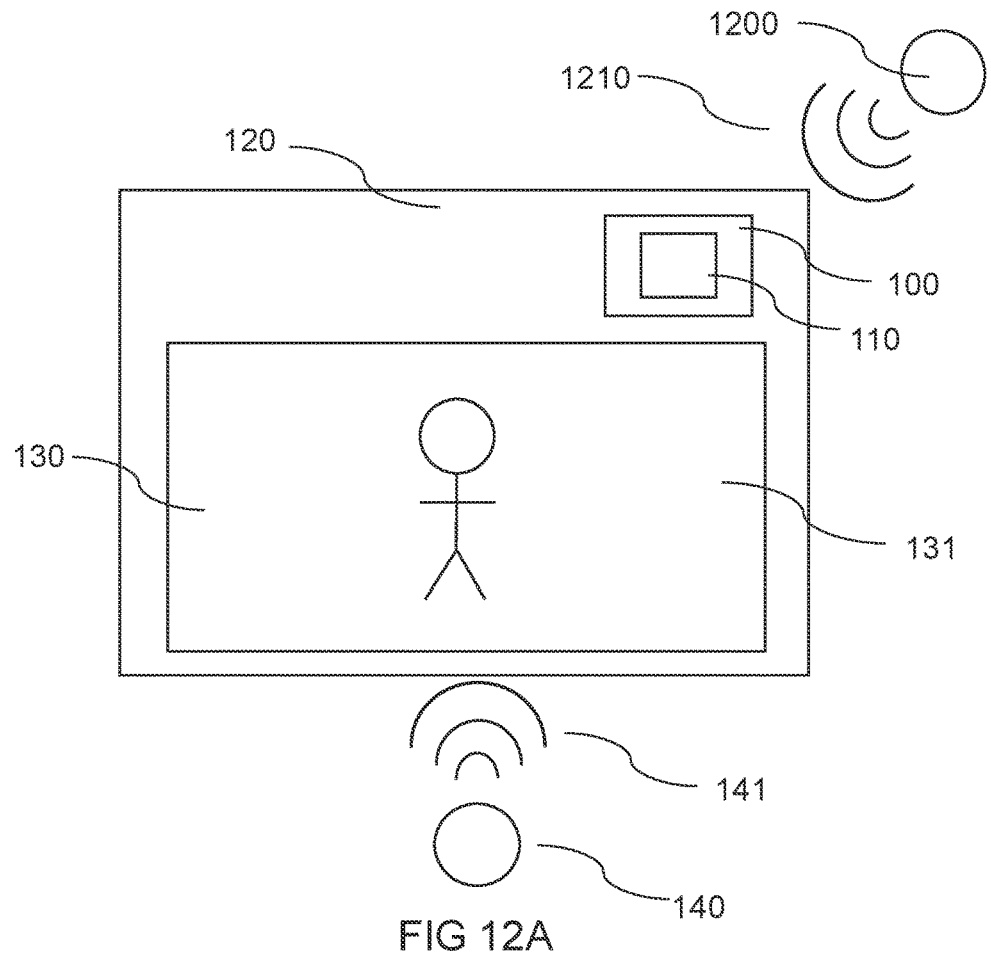
FIG. 12A shows an example of the subject matter described herein.
Figure 12B:
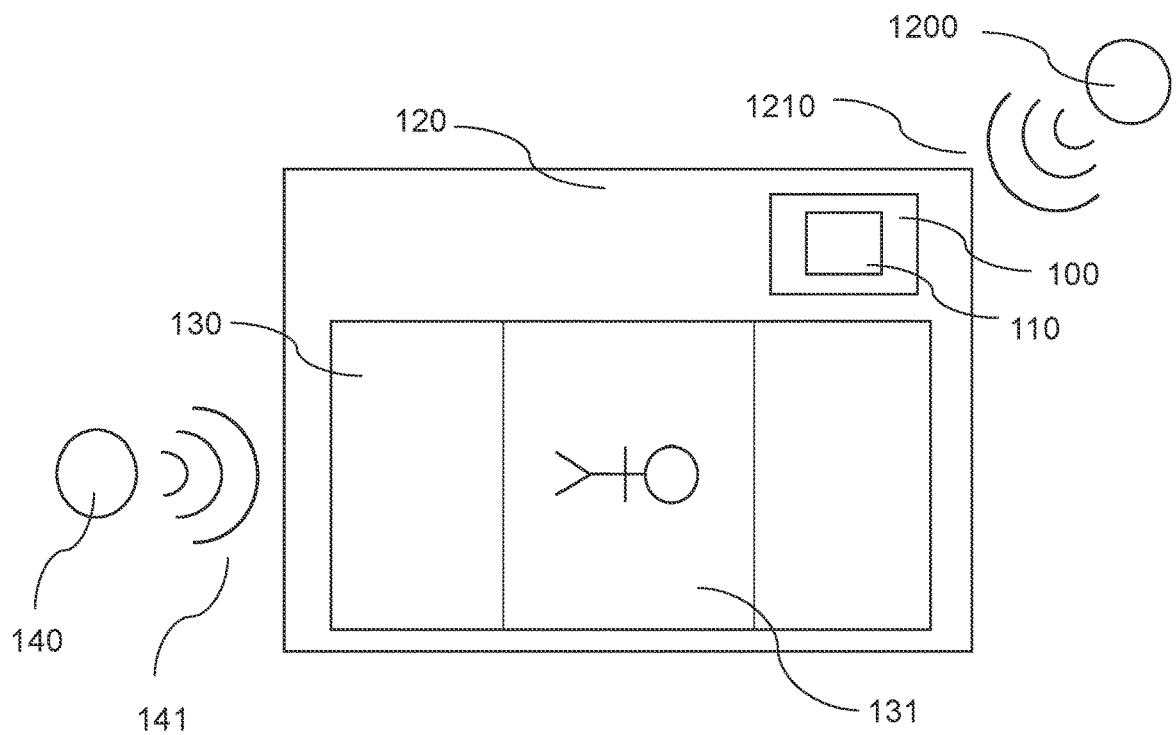
FIG. 12B shows an example of the subject matter described herein.

FIG. 12A and FIG. 12B illustrate another example apparatus 100. In this example, the apparatus comprises means for: identifying the sound source 140 as a previously known sound source; and restricting changing of the angle of orientation of the visual information 131. Unknown sound sources, such as sound source 1200 producing at least one audio signal 1210, are restricted from causing changing of the angle of orientation of the visual information 131.

As illustrated in FIG. 12B, the angle of orientation of the visual information 131 has changed from its angle of orientation in FIG. 12A in response to determining the direction of arrival of sound from the sound source 140. The angle of orientation of the visual information 131 has not been changed by the direction of arrival of sound from the sound source 1200.

The means 110 can either use stored information relating to known sound sources, or have access to information relating to known sound sources.

The examples illustrated in FIG. 12A and FIG. 12B can provide the advantage that unauthorized users cannot control the angle of orientation of the visual information 131. These examples can provide the advantage that in noisy environments, for example a room with several people, that only authorized sound sources 140 can control the angle of orientation of the visual information 131.

Figure 13A:
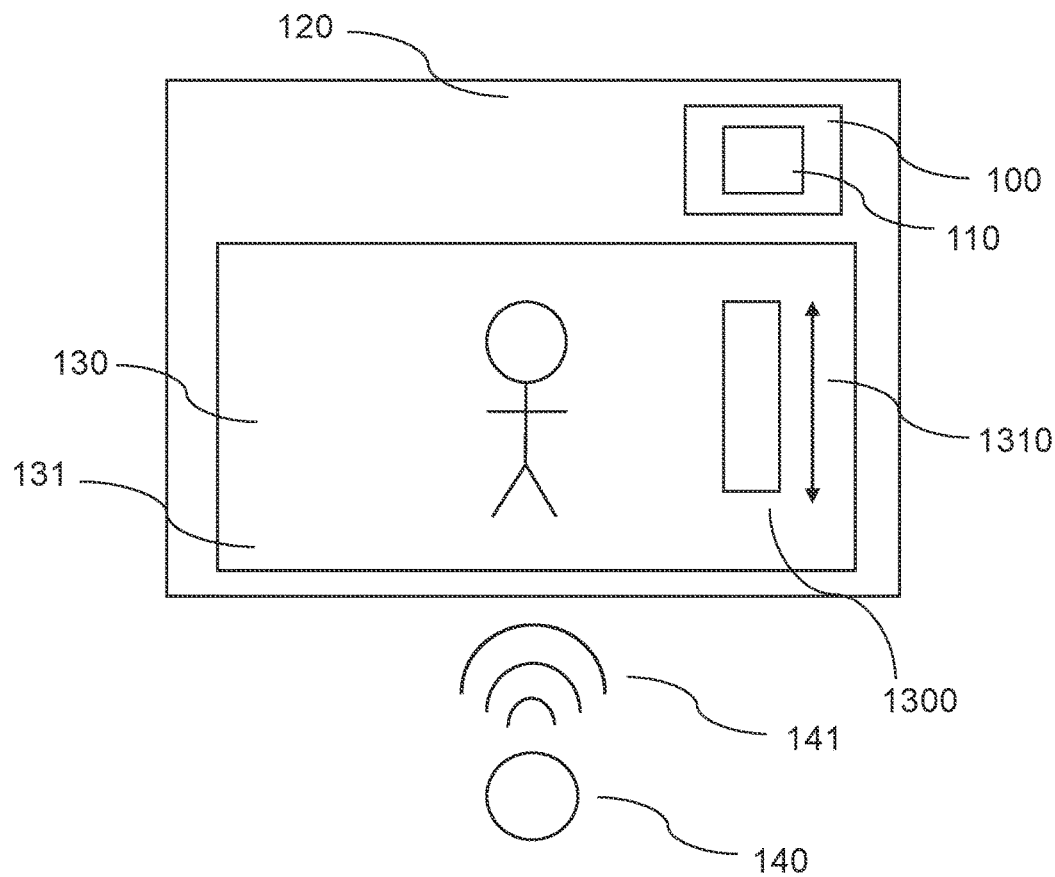
FIG. 13A shows an example of the subject matter described herein.
Figure 13B:
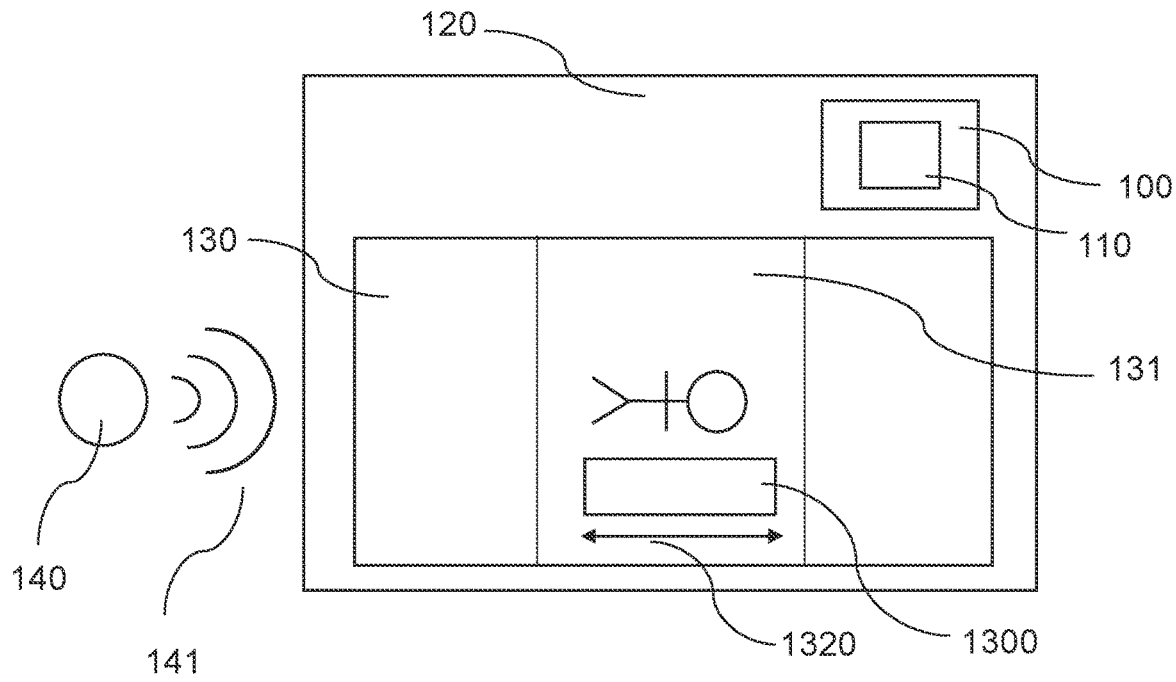
FIG. 13B shows an example of the subject matter described herein.

FIGS. 13A and 13B illustrate another example apparatus 100. In this example the display comprises means for enabling one or more gesture controls, wherein the one or more gesture controls are activated by corresponding gesture inputs 1310 by a user, wherein the apparatus comprises means 110 for controlling adjustment of the one or more gesture controls, wherein the one or more gesture controls are adjusted if the angle of orientation of the visual information 131 is changed so that when a gesture input 1310 is performed relative to the changed angle of orientation of the visual information 131, the gesture input 1310 is recognized, and the corresponding gesture control is activated.

In FIG. 13A and FIG. 13B, area 1300 represents an area of the display which can detect a particular gesture control. For example, the gesture control can be a control which enables altering the volume of audio associated with the visual information 131. When the visual information 131 is presented at the angle of orientation in FIG. 13A, the gesture control is activated by the gesture input indicated by arrow 1310, In some examples, the gesture input is a proximity input, where a user can place their finger above the area 1300 and move their finger as indicated by arrow 1310 to change the volume of audio associated with the visual information.

In FIG. 13B, the angle of orientation of the visual information 131 has changed in response to determining the direction of arrival of sound from the sound source 140. The area 1300 has rotated and the gesture input that is recognized to activate the gesture control is illustrated by the arrow 1320. The apparatus therefore enables adaptation of gesture controls in response to a change in angle of orientation of the visual information 131.

In other examples, the gesture input is a movement of a user's hand and/or arm, detected by, for example, motion detection means of the apparatus 100. When the angle of orientation of the visual information 131 is presented at the angle of orientation in FIG. 13A, the gesture control is activated by movement of the user's hand and/or arm in the direction indicated by arrow 1301, which is detected by the motion detection means. This can, for example, be a swiping motion of the user's hand and/or arm.

When the angle of orientation of the visual information 131 is presented at the angle of orientation in FIG. 13B, the gesture control is activated by movement of the user's hand and/or arm in the direction indicated by arrow 1320, detected by the motion detected means. The apparatus therefore enables adaptation of gesture controls where the gesture input is a movement of a user's hand and/or in response to a change in angle of orientation of the visual information 131.

In some example, the gesture input is a sequence of movements of a user's hand and/or arm, detected by the motion detection means.

The gesture input can be performed at any position within the field of view of the motion detection means, and therefore is not limited to a particular area of the display as with other examples.

The motion detection means can comprise, for example, a camera and/or a depth sensor. The means 110 can have built-in logic which is used to recognize the detected movement as the gesture input and adjust what movement relative to the motion detection means is detected as the gesture input.

Figure 13C:
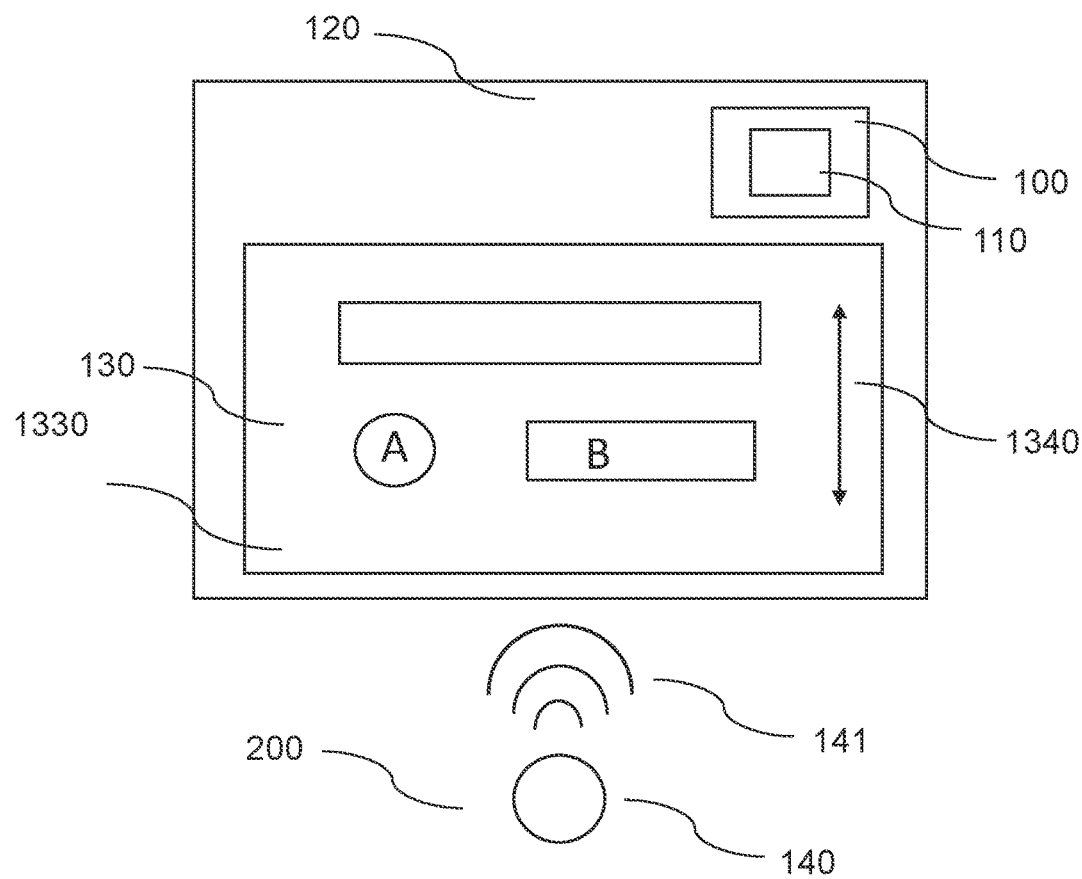
FIG. 13C shows an example of the subject matter described herein.
Figure 13D:
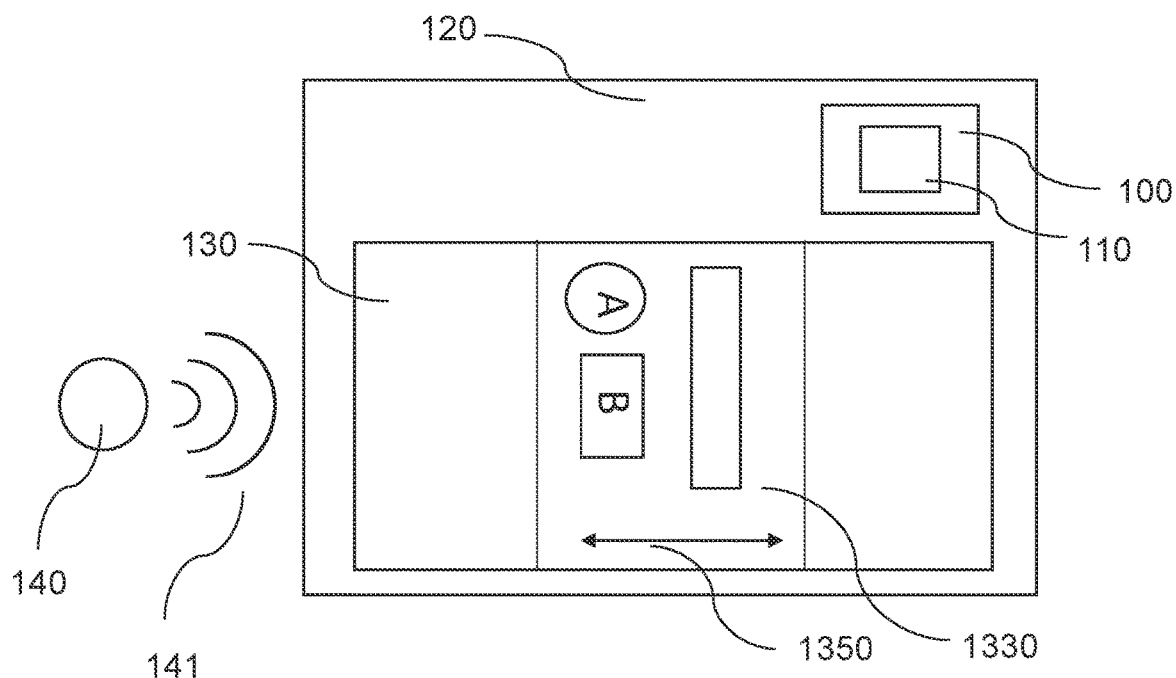
FIG. 13D shows an example of the subject matter described herein.

The one or more gesture controls can relate to gesture controls that control one or more features of an application associated with the visual information 131. For example, the volume control as illustrated in FIG. 13A and FIG. 13B can be associated with the application. In some examples the one or more gesture controls can relate to one or more system menus 1330 associated with the display 130. For example, where the user device comprises the display, a system menu 1330 for the user device may be activated by a gesture control, and this gesture control can be adjusted by the rotation of the visual information. As illustrated in FIG. 13C and FIG. 13D, arrow 1340 represents a gesture input that can activate and deactivate the system menu 1330. For example, applying the gesture input in one direction of the arrow 1340 activates the system menu, and the other direction of the arrow 1340 deactivates the system menu. As illustrated in FIG. 13D, the determined direction of arrival of sound from the sound source 140 has changed, and the gesture control has been rotated so that the arrow 1350 represents the gesture input that is recognized to activate the gesture control. As illustrated in FIG. 13D, the angle of orientation that the system menu 1330 is displayed at on the display 130 is dependent upon the determined angle of orientation of sound from the sound source 140. The system menu 1330 can overlay the visual information when activated.

The examples illustrated in FIG. 13A, FIG. 13B, FIG. 13C and FIG. 13D illustrate examples of one or more gesture controls and corresponding gesture inputs. In some examples, the display 130 can comprise means for enabling one or more touch controls, wherein the one or more touch controls are activated by corresponding touch inputs, wherein the apparatus 100 comprises means for controlling adjustment of the one or more touch controls, wherein the one or more touch controls are adjusted if the angle of orientation of the visual information 131 is changed so that when a touch input is performed relative to the changed orientation of the visual information, the touch input is recognized, and the corresponding touch control is activated.

In these examples, the area 1300 represents an area of the display which can detect a particular touch control. The arrows 1310, 1320, 1340, 1350 represent the touch input that activates the corresponding touch control. The one or more touch controls can operate alongside the gesture controls. In some examples, a touch control and a gesture control relate to the same control. For example, the volume control illustrated in FIGS. 13A and 13B may be controlled by both the touch control and the gesture control. In some examples, one or more touch controls are provided which provide different controls to the one or more gesture controls.

Figure 14A:
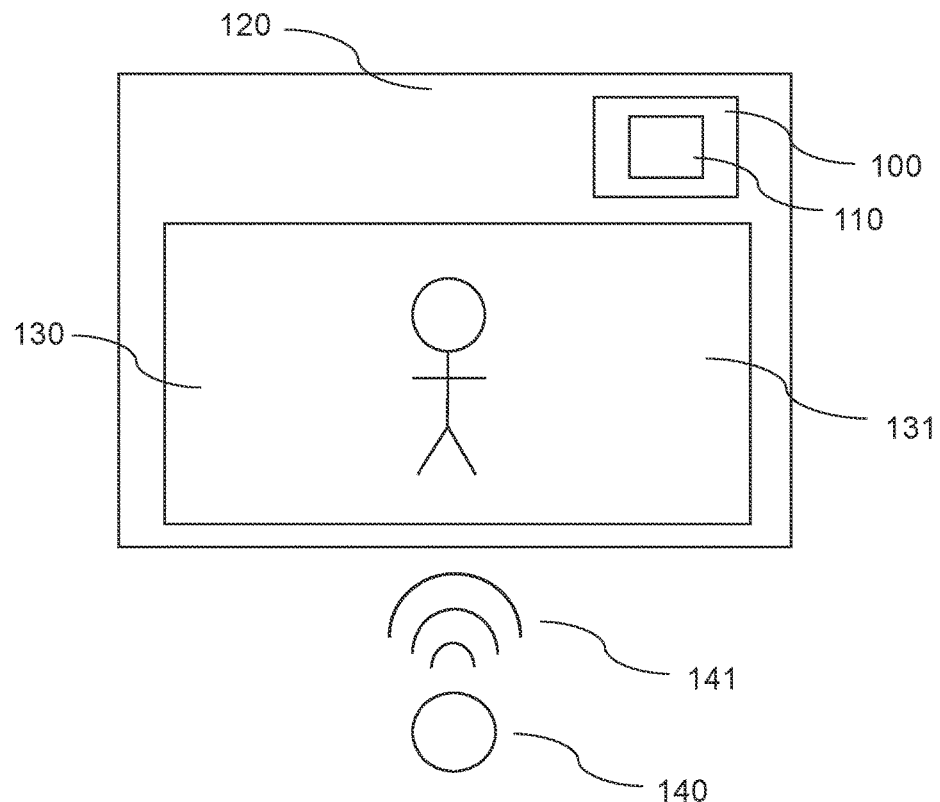
FIG. 14A shows an example of the subject matter described herein.
Figure 14B:
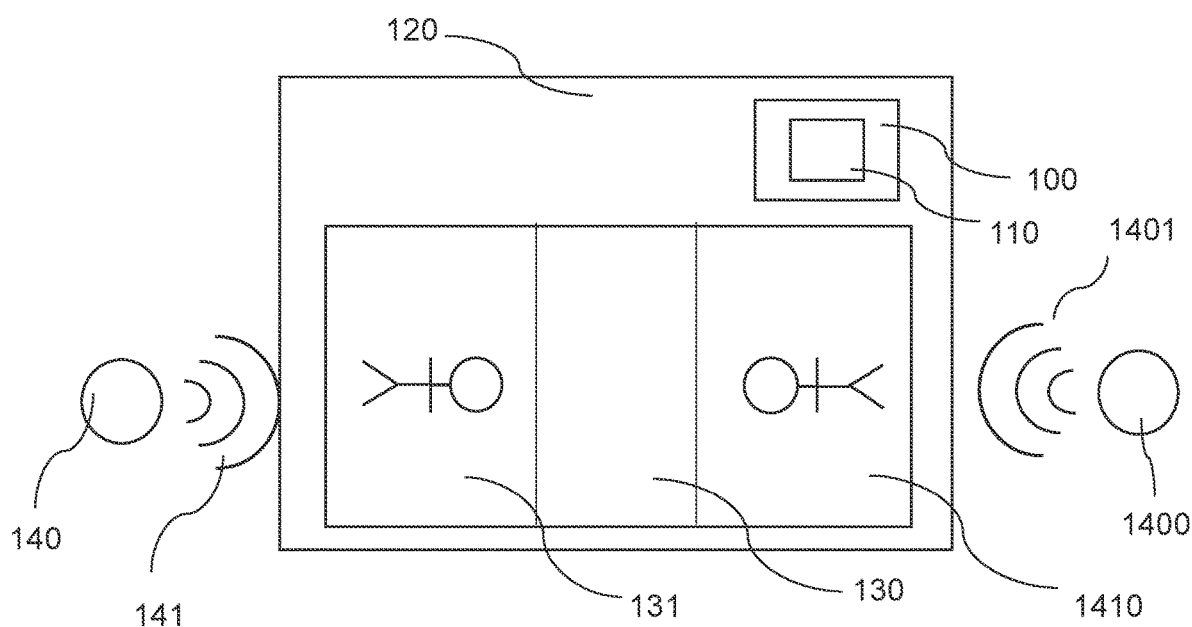
FIG. 14B shows an example of the subject matter described herein.

FIGS. 14A and 14B illustrate another example apparatus 100. In this example the apparatus comprises means for: determining a direction of arrival of sound from a second sound source 1400 relative to the user device 120 using at least one captured audio signal 1401; controlling an angle of orientation of second visual information 1410 displayed on the display, wherein the visual information 131 and the second visual information 1410 are displayed on the display 130 at the same time, wherein the angle of orientation of the second visual information 1410 is at least partially dependent upon the determined direction of arrival of sound from the second sound source 1400 relative to the user device 120.

In the example of FIG. 14A and FIG. 14B, the visual information 131 and the second visual information 1410 are initially the same piece of visual information 131 as illustrated in FIG. 14A. In response to determining that a sound source 140 and a second sound source 1400 are detected with corresponding directions of arrival of sound, the visual information is presented as two separate pieces of visual information, visual information 131 and second visual information 1410 as illustrated in FIG. 14B. In some examples, multiple copies of the same visual information 131 can be displayed on the display, and the determined directions of arrival of sound from multiple sound sources can each individually control the angle of orientation and/or position of a copy associated with that sound source 140.

In other examples, several different pieces of visual information can be displayed on the display 130, which can be associated with different applications. This enables multiple users to use the same display 130 to view different visual information. In some examples there are more than two sound sources detected and each sound source can interact with a different piece of visual information. Each piece of visual information can be associated with a particular user by assigning that visual information to a particular voice in examples where the sound source is a user's voice. The apparatus can control the different pieces of visual information so that they do not overlap one another as the sound sources change their position and alter the angle of orientation and/or the position of the visual information.

Gesture and/or touch controls associated with each piece or copy of visual information can be provided and can adjust accordingly as the angle of orientation and/or the position of the visual information changes.

Figure 15:
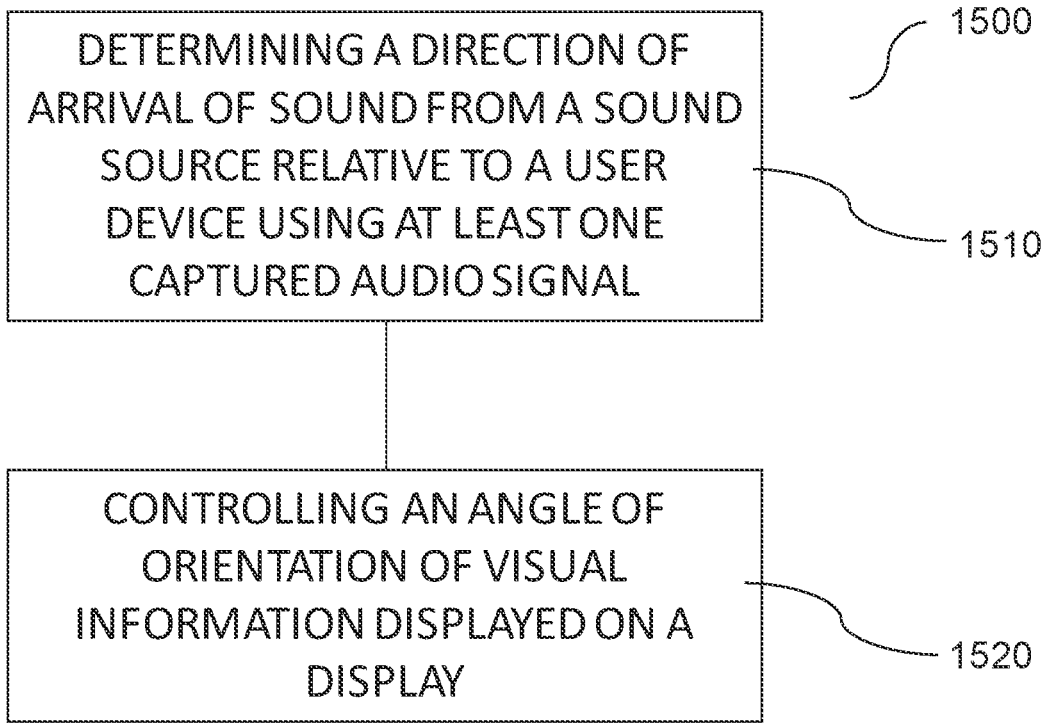
FIG. 15 shows an example method described herein.

FIG. 15 illustrates an example method 1500. The method comprises determining a direction of arrival of sound from a sound source 140 relative to a user device 120 using at least one captured audio signal 141 as illustrated in block 1510. The method also comprises controlling an angle of orientation of visual information 131 displayed on a display 130 as illustrated in block 1520. The angle of orientation of the visual information 131 is at least partially dependent upon the determined direction of arrival of sound from the sound source 140 relative to the user device 120.

Figure 16:
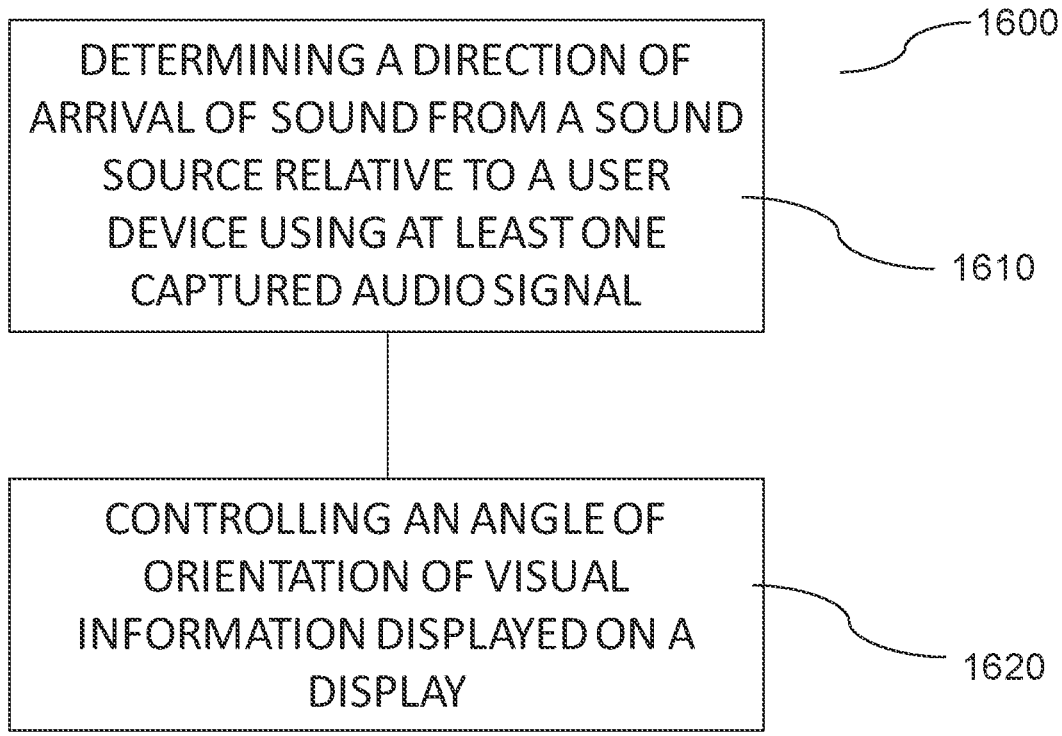
FIG. 16 shows an example computer program described herein.

FIG. 16 illustrates an example computer program 1600 that, when run on a computer, performs: determining a direction of arrival of sound from a sound source 140 relative to a user device 120 using at least one captured audio signal 141 as illustrated in block 1610; controlling an angle of orientation of visual information 131 displayed on a display 130 as illustrated in block 1620. The angle of orientation of the visual information 131 is at least partially dependent upon the determined direction of arrival of sound from the sound source 140 relative to the user device 120.

The examples illustrated and described above in FIGS. 1A-14B can be provided as additional blocks in the method 1500 and/or the computer program 1600.

The examples illustrated and described above in FIGS. 1A-14B can all be implemented in an apparatus 100. In some examples, a combination of one or more examples can be selected by user preference. Where examples are mutually exclusive, they can be provided as alternative settings of an application or settings of the apparatus 100 and/or user device 120 and/or display 130.

In the examples illustrated in FIGS. 2A-14B, the user device 120 comprises the apparatus 100 and the display 130. The examples illustrated in FIGS. 2A-14B can also be implemented where the apparatus 100, user device 120, display 130 are separate or where any two are combined. Communication between the apparatus 100, user device 120, display 130 can be provided by physical interfaces, wireless interfaces or a combination thereof.

The visual information 131 can be any information that can be displayed on the display 130. This can include images, videos, user interfaces, applications, amongst others.

In some example apparatus, methods and computer programs, the examples illustrated above in FIGS. 1A-16 can be used when it is determined that the plane of the display 130 is parallel to the surface of the earth, or is within a threshold tilt from the surface of the earth. This can provide the advantage that the angle of orientation of the visual information 131 displayed on the display can be changed whilst other methods of changing the angle of orientation are not available or are unreliable. The other methods can be used when the display 130 exceeds the threshold tilt. Other methods include, for example, using an accelerometer associated with the display 130.

In some examples, the apparatus comprises an Ultra Wide Band (UWB) device can be used to determine the direction of a sound source from the user device. In these examples, the sound source 140 is associated with a UWB device which communicates with the UWB device of the apparatus. This can be used in conjunction with or instead of determining the direction of arrival of sound from the sound source 140.

In the examples illustrated above, the user device can be a mobile device. The user device can be a tablet device. The display can be a display of a mobile device. The display can be a tablet device. The display can be a large screen, which can be integrated or mounted on a surface.

Figure 17:
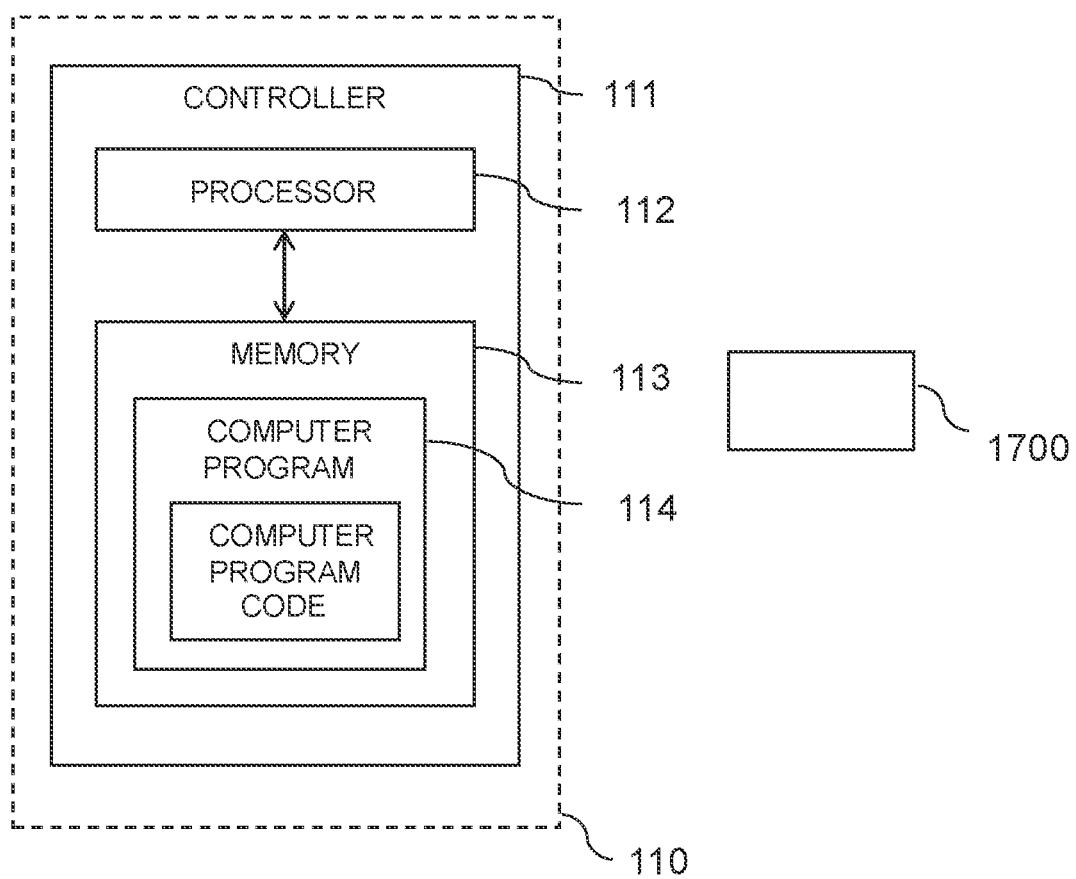
FIG. 17 shows an example of the subject matter described herein.

FIG. 17 illustrates example means 110 used in the examples illustrated above. In FIG. 17, the means 110 comprises a controller 111. Implementation of a controller 111 may be as controller circuitry. The controller 111 may be implemented in hardware alone, have certain aspects in software including firmware alone or can be a combination of hardware and software (including firmware).

As illustrated in FIG. 17 the controller 111 may be implemented using instructions that enable hardware functionality, for example, by using executable instructions of a computer program 114 in a general-purpose or special-purpose processor 112 that may be stored on a computer readable storage medium (disk, memory, etc.) to be executed by such a processor 112.

The processor 112 is configured to read from and write to the memory 113. The processor 112 may also comprise an output interface via which data and/or commands are output by the processor 112 and an input interface via which data and/or commands are input to the processor 112.

The memory 113 stores a computer program 114 comprising computer program instructions (computer program code) that controls the operation of the apparatus 100 when loaded into the processor 112. The computer program instructions, of the computer program 114, provide the logic and routines that enables the apparatus to perform the methods illustrated in FIGS. 15 and 16. The processor 112 by reading the memory 113 is able to load and execute the computer program 114.

Therefore, in some examples the apparatus 100 therefore comprises:
at least one processor 112; and
at least one memory 113 including computer program code
the at least one memory 113 and the computer program code configured to, with the at least one processor 112, cause the apparatus 100 at least to perform:

determining a direction of arrival of sound from a sound source 140 relative to a user device 120 using captured at least one audio signal 141;
controlling an angle of orientation of visual information 131 displayed on a display 130, wherein the angle of orientation of the visual information 131 is at least partially dependent upon the determined direction of arrival of sound from the sound source 140 relative to the user device 120.

As illustrated in FIG. 17, the computer program 114 may arrive at the apparatus 100 via any suitable delivery mechanism 1700. The delivery mechanism 1700 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 114. The delivery mechanism may be a signal configured to reliably transfer the computer program 114. The apparatus 100 may propagate or transmit the computer program 114 as a computer data signal.

Computer program instructions can be provided for causing an apparatus 100 to perform at least the following or for performing at least the following:
causing determining of a direction of arrival of sound from a sound source 140 relative to a user device 120 using at least one captured audio signal 141;
causing controlling of an angle of orientation of visual information 131 displayed on a display 130, wherein the angle of orientation of the visual information 131 is at least partially dependent upon the determined direction of arrival of sound from the sound source 140 relative to the user device 120.

The computer program instructions may be comprised in a computer program, a non-transitory computer readable medium, a computer program product, a machine readable medium. In some but not necessarily all examples, the computer program instructions may be distributed over more than one computer program.

Although the memory 113 is illustrated as a single component/circuitry it may be implemented as one or more separate components/circuitry some or all of which may be integrated/removable and/or may provide permanent/semi-permanent/dynamic/cached storage.

Although the processor 112 is illustrated as a single component/circuitry it may be implemented as one or more separate components/circuitry some or all of which may be integrated/removable. The processor 112 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable visual information of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 15 and 16 may represent steps in a method and/or sections of code in the computer program 114. The illustration of a particular order to the blocks does not necessarily imply that there is a required or preferred order for the blocks and the order and arrangement of the block may be varied. Furthermore, it may be possible for some blocks to be omitted.

In the examples described above, the means 110 can use any suitable method for determining the direction of arrival of sound from a sound source relative to the user device 120 using at least one captured audio signal 141. For example, the processor 112 can determine direction of arrival of sound from a sound source. The means 110 can be arranged to receive at least one captured audio signal from a plurality of audio sensors. The one or more audio sensors can be spatially distributed so that the at least one captured audio signal represents spatial sound.

In some examples the plurality of audio sensors comprise a microphone array. The microphones within the array can be arranged within the array so that they can enable spatial sound to be recorded.

The processor 112 within the means 110 can be configured to use the at least one captured audio signal 141 to obtain spatial metadata. The spatial metadata corresponds to the spatial sound represented by the at least one audio signal. The spatial metadata comprises information relating to the spatial properties of the sound space recorded by the microphones. The spatial metadata may be determined in frequency bands. The spatial metadata can comprise information such as the directions of arrival, distances, direct-to-total energy ratios for each of the frequency bands in the signals.

To determine the direction of arrival of an audio signal, the audio sensors can be spaced apart so that the direction of arrival of an audio signal can be determined from phase and amplitude differences measured by the one or more audio sensors. Information relating to the relative locations of the audio sensors to each other and to the user device may either be known to the processor 112 (for example it is stored in the memory 113) or may be provided to the controller 111. The processor 112 defines an origin to which the directions of arrival are determined. For example, the origin is defined as the location of the user device 120.

The means 110 can use any suitable method to determine from the at least one captured audio signals whether the sound source 140 or any other sound sources are present. For example, to determine whether a sound source is present, the processor 112 can use methods and information stored in the memory 113. This will depend on the type of sound source there is to be detected. In the example where the sound source can be any voice, the processor 112 is configured to recognise from the at least one captured audio signals that a voice is present by frequency patterns that are associated with voices. In some examples, for example as illustrated in FIG. 12A and FIG. 12B, the processor 112 can determine that the sound source is a previously known sound source 140. Where the sound source is a voice of a user, the processor 112 can use information and methods stored in the memory 113, such as a voice pattern of a known user, to determine that the sound source is the known sound source.

In some examples the means 110 changes the angle or orientation of the visual information or any other change to the visual information described above in response to a specified command from the user. For example, the processor 112 can use the at least one captured audio signals to determine if the user has spoken a command.

In other examples the sound source 140 is not the voice of the user. In these examples the sound source can be any sound source which produces a sound that the means 110 can recognise. For example, the sound source can produce audio signals with a particular frequency pattern, amplitude pattern, a combination of both or any other audio property that could be used to identify the sound source.

In some examples, to change the visual information 131 that is displayed on the display 130, the controller 111 is configured to control the display. For example, the apparatus 100 and the display 130 are part of the same device. In other examples, where the apparatus 100 and the display 130 are in separate devices, the controller 111 can provide instructions to the controller of the device that controls the display. Similarly, in examples where the apparatus changes user interface controls and/or gesture controls and/or touch controls, in some examples the apparatus 100 and the display 130 are part of the same device and the controller 111 is configured to change the controls and the inputs it recognises. In other examples where the apparatus 100 and the display 130 are not part of the same device, the controller 111 is configured to provide instructions to the controller of the display 130 to change the controls and inputs it is configured to recognise.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The above described examples find application as enabling components of:

automotive systems; telecommunication systems; electronic systems including consumer electronic products; distributed computing systems; media systems for generating or rendering media visual information including audio, visual and audio visual visual information and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory including computer program code,
      the at least one memory and the computer program code configured to, with the at least one processor, cause the apparatus to perform at least the following:
      determine, using at least one captured audio signal, a direction of arrival of sound from a sound source relative to a user device and a distance of the sound source from the user device;
      responsive to the distance of the sound source from the user device being less than a threshold distance, control an angle of orientation of visual information displayed on a display, wherein the angle of the orientation of the visual information is at least partially dependent upon the determined direction of arrival of sound from the sound source relative to the user device; and
      responsive to the distance of the sound source from the user device being greater than the threshold distance, maintain the angle of orientation of the visual information displayed on the display without change by preventing change to the angle of orientation of the visual information displayed on the display based on the determined direction of arrival of sound from the sound source relative to the user device.

2. The apparatus as claimed in claim 1, further configured to cause to control a position of the visual information is displayed at on the display, wherein the position of the visual information displayed on the display is at least partially dependent upon the determined direction of arrival of sound from the sound source relative to the user device.

3. The apparatus as claimed in claim 1, further configured to cause to determine changes of the direction of arrival of sound from the sound source relative to the user device;
   wherein the controlling the angle of the orientation of the visual information displayed on the display correspondingly changes the angle of the orientation of the visual information in response to a determined change in the direction of arrival of sound from the sound source.

4. The apparatus as claimed in claim 1, further configured to cause to change the angle of the orientation of the visual information to a predefined angle after determining that the determined direction of arrival of sound from the sound source satisfies a threshold direction of arrival associated with the predefined angle.

5. The apparatus as claimed in claim 1, further configured to cause to estimate a location of the sound source relative to the user device whilst the sound source is not producing sound; and
wherein the angle of the orientation of the visual information is at least partially dependent upon the estimated location of the sound source relative to the user device whilst the sound source is not producing sound.

6. The apparatus as claimed in claim 1, further configured to cause to at least one of alter a scale of the visual information or crop the visual information, wherein at least one of the altering or cropping is at least partially dependent upon the angle of the orientation of the visual information.

7. The apparatus as claimed in claim 1, wherein user interface controls associated with the visual information are displayed on the display, wherein the apparatus is further configured to cause to adjust at least one of a position or an orientation of the user interface controls, wherein the adjusting is at least partially dependent upon the angle of the orientation of the visual information.

8. The apparatus as claimed in claim 1,
wherein the angle of the orientation of the visual information displayed on the display additionally depends upon application settings of an application running on the display, wherein the application is associated with the visual information.

9. The apparatus as claimed in claim 1, wherein the visual information comprises one or more images or video captured by image capture means of the user device;
wherein if the user device is rotated whilst the one or more images or video is being captured, wherein the controlling the angle of the orientation of the visual information comprises maintaining the angle of the orientation of the visual information displayed on the display by determining the direction of arrival of sound from the sound source relative to the rotated user device to counteract changes to the angle of the orientation of the visual information displayed on the display that do or could occur due to the rotation of the user device.

10. The apparatus as claimed in claim 1, further configured to cause to:
identify the sound source as a previously known sound source; and
restrict changing of the angle of the orientation of the visual information, wherein unknown sound sources are restricted from causing changing of the angle of the orientation of the visual information.

11. The apparatus as claimed in claim 1, further configured to cause to:
determine a direction of arrival of sound from a second sound source relative to the user device using at least one captured audio signal;
control an angle of orientation of second visual information displayed on the display, wherein the visual information and the second visual information are displayed on the display at the same time, wherein the angle of the orientation of the second visual information is at least partially dependent upon the determined direction of arrival of sound from the second sound source relative to the user device.

12. A method comprising:
determining, using at least one captured audio signal, a direction of arrival of sound from a sound source relative to a user device and a distance of the sound source from the user device;
responsive to the distance of the sound source from the user device being less than a threshold distance, controlling an angle of orientation of visual information displayed on a display, wherein the angle of the orientation of the visual information is at least partially dependent upon the determined direction of arrival of sound from the sound source relative to the user device; and
responsive to the distance of the sound source from the user device being greater than the threshold distance, maintaining the angle of orientation of the visual information displayed on the display without change by preventing change to the angle of orientation of the visual information displayed on the display based on the determined direction of arrival of sound from the sound source relative to the user device.

13. The method as claimed in claim 12, further comprising:
controlling a position of the visual information is displayed at on the display, wherein the position of the visual information displayed on the display is at least partially dependent upon the determined direction of arrival of sound from the sound source relative to the user device.

14. The method as claimed in claim 12, further comprising:
determining changes of the direction of arrival of sound from the sound source relative to the user device;
wherein the controlling the angle of the orientation of the visual information displayed on the display correspondingly changes the angle of the orientation of the visual information in response to a determined change in the direction of arrival of sound from the sound source.

15. The method as claimed in claim 12, further comprising:
changing the angle of the orientation of the visual information to a predefined angle after determining that the determined direction of arrival of sound from the sound source satisfies a threshold direction of arrival associated with the predefined angle.

16. The method as claimed in claim 12, further comprising:
estimating a location of the sound source relative to the user device whilst the sound source is not producing sound; and
wherein the angle of the orientation of the visual information is at least partially dependent upon the estimated location of the sound source relative to the user device whilst the sound source is not producing sound.

17. The method as claimed in claim 12, further comprising: at least one of altering a scale of the visual information or cropping the visual information, wherein at least one of the altering or cropping is at least partially dependent upon the angle of the orientation of the visual information.

18. The method as claimed in claim 12, wherein user interface controls associated with the visual information are displayed on the display, wherein the method further comprises adjusting at least one of a position or an orientation of the user interface controls, wherein the adjusting is at least partially dependent upon the angle of the orientation of the visual information.

19. A non-transitory computer readable medium comprising program instructions stored thereon for performing at least the following:
- determining, using at least one captured audio signal, a direction of arrival of sound from a sound source relative to a user device and a distance of the sound source from the user device;
- responsive to the distance of the sound source from the user device being less than a threshold distance, controlling an angle of orientation of visual information displayed on a display, wherein the angle of the orientation of the visual information is at least partially dependent upon the determined direction of arrival of sound from the sound source relative to the user device; and
- responsive to the distance of the sound source from the user device being greater than the threshold distance, maintaining the angle of orientation of the visual information displayed on the display without change by preventing change to the angle of orientation of the visual information displayed on the display based on the determined direction of arrival of sound from the sound source relative to the user device.

\* \* \* \* \*

UNITED STATES PATENT AND TRADEMARK OFFICE
CERTIFICATE OF CORRECTION

PATENT NO. : 12,067,321 B2  
APPLICATION NO. : 17/580383  
DATED : August 20, 2024  
INVENTOR(S) : Arto Juhani Lehtiniemi et al.

Page 1 of 1

It is certified that error appears in the above-identified patent and that said Letters Patent is hereby corrected as shown below:

In the Claims

In Column 22, Line 54, Claim 2, delete "information is" and insert -- information --, therefor.

In Column 22, Line 55, Claim 2, delete "at on" and insert -- on --, therefor.

In Column 24, Line 24, Claim 13, delete "information is" and insert -- information --, therefor.

In Column 24, Line 25, Claim 13, delete "at on" and insert -- on --, therefor.

Signed and Sealed this  
Twenty-fourth Day of December, 2024

Derrick Brent  
*Acting Director of the United States Patent and Trademark Office*